(12) United States Patent
Nishimura et al.

(10) Patent No.: US 7,021,050 B2
(45) Date of Patent: Apr. 4, 2006

(54) ENGINE EXHAUST PARTICULATE AFTER-TREATMENT SYSTEM

(75) Inventors: Hiroyuki Nishimura, Hiroshima (JP); Eriko Yashiki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 65 days.

(21) Appl. No.: 10/615,380

(22) Filed: Jul. 9, 2003

(65) Prior Publication Data

US 2004/0020194 A1    Feb. 5, 2004

(30) Foreign Application Priority Data

Jul. 15, 2002    (JP) .............. 2002-205045

(51) Int. Cl.
*F01N 3/00*    (2006.01)
(52) U.S. Cl. ............. 60/295; 60/278; 60/280; 60/286; 60/297; 123/568.11
(58) Field of Classification Search .......... 60/274, 60/278, 280, 285, 286, 292, 295, 297, 311; 123/568.11, 568.18, 568.19, 568.31
See application file for complete search history.

(56) References Cited

U.S. PATENT DOCUMENTS

| | | |
|---|---|---|
| 4,747,264 A | 5/1988 | Santiago et al. |
| 4,835,964 A * | 6/1989 | Kume et al. ............ 60/285 |
| 5,042,248 A | 8/1991 | Abthoff et al. |
| 6,276,130 B1 * | 8/2001 | Ito et al. ............ 60/278 |
| 6,574,956 B1 * | 6/2003 | Moraal et al. .......... 60/295 |
| 6,655,133 B1 * | 12/2003 | Kimura et al. ......... 60/296 |
| 6,763,799 B1 * | 7/2004 | Ito et al. ............ 123/299 |
| 6,823,665 B1 * | 11/2004 | Hirota et al. ......... 60/296 |

FOREIGN PATENT DOCUMENTS

| | | |
|---|---|---|
| FR | 2 820 462 | 8/2002 |
| JP | 5-11205 B2 | 2/1993 |

OTHER PUBLICATIONS

Patent Abstract of Japan vol. 016, No. 232 May 28, 1992 & JP 04 047120 A (Nissan Motor Co Ltd) Feb. 17, 1992 *Abstract*.
European Search Report Dated Sep. 16, 2003.

* cited by examiner

*Primary Examiner*—Binh Q. Tran
(74) *Attorney, Agent, or Firm*—Nixon Peabody LLP; Donald R. Studebaker

(57) ABSTRACT

An exhaust particulate trapping means 12 for trapping particulates in exhaust gases is provided in an exhaust path 3 of an engine. When the engine enters a deceleration condition during the removal by burning of exhaust particulates trapped by the exhaust particulate trapping means 12, the drop of the flow rate of exhaust gases flowing into the exhaust particulate trapping means 12 is restricted. Thus, the cooling action of the exhaust particulate trapping means 12 through heat exchange with the exhaust gases can be kept up to suppress that the temperature of the exhaust particulate trapping means 12 excessively rises on engine deceleration.

11 Claims, 14 Drawing Sheets

ENGINE EXHAUST PARTICULATE AFTER-TREATMENT SYSTEM

BACKGROUND OF THE INVENTION (a) Field of the Invention

This invention relates to an engine exhaust particulate after-treatment system.

(b) Description of the Related Art

For the purpose of purification of exhaust gases from diesel engines, there has been recently employed a technology for trapping exhaust particulates such as carbon contained in exhaust gases by a particulate filter disposed in an exhaust path of the engine to prevent atmospheric release.

In such a diesel engine provided with a particulate filter, when the amount of exhaust particulate accumulated on the particulate filter reaches a saturation amount which is the limit to which the particulate filter can accumulate exhaust particulates, it is necessary to burn the accumulated exhaust particulates to regenerate the function of the filter.

As an example of filter regeneration techniques, there is known one for burning exhaust particulates in such a manner to raise the exhaust gas temperature by operating a heater provided in the particulate filter or by retarding the timing of fuel injection from a fuel injection valve behind that during normal operation to promote after-burning.

In the above known technique, however, if the engine operating condition changes to a deceleration condition in the course of regeneration of the particulate filter, this may cause a problem that the temperature of the particulate filter may rise suddenly to deteriorate the durability thereof.

More specifically, while the particulate filter during regeneration raises its temperature as a result of the burning of exhaust particulates, it suddenly raises its temperature, when the exhaust gas flow rate decreases due to vehicle deceleration, because the particulate filter attenuates its cooling action caused by the passage of exhaust gases therethrough (a cooling action caused by heat exchange between the exhaust gases and the particulate filter).

Japanese Examined Patent Publication No. 5-11205 discloses a technique for suppressing dissolution loss of a particulate filter, when the engine operating mode shifts from a high load to idling condition and the temperature of the particulate filter and the oxygen concentration in exhaust gases then exceed their predetermined levels, by reducing the oxygen concentration in the exhaust gases to below the predetermined level.

This known art technique, however, does not approach the problem of dissolution loss of the particulate filter until the engine operating mode has shifted from a high load to idling condition and the temperature of the particulate filter increases, and does not intend to prevent the occurrence of temperature rise of the particulate filter on engine deceleration which means the period of transition from a high load to idling condition. Therefore, the above problem cannot be solved by this known art technique, nor has it still been solved.

SUMMARY OF THE INVENTION

An object of the present invention is to provide an engine exhaust particulate after-treatment system that can suppress the temperature rise of a particulate filter on engine deceleration during the removal of exhaust particulates.

Another object of the present invention is to provide a computer program for suppressing the temperature rise of a particulate filter on engine deceleration during the removal of exhaust particulates.

To attain the first-mentioned object, the present invention is directed to an engine exhaust particulate after-treatment system comprising exhaust particulate trapping means provided in an exhaust path of an engine for trapping particulates in exhaust gases, and characterized by further comprising exhaust flow rate drop restriction means for restricting, on deceleration of the engine during the removal by burning of exhaust particulates trapped by the exhaust particulate trapping means, the drop of the flow rate of exhaust gases flowing into the exhaust particulate trapping means.

According to the present invention, even when the engine enters a deceleration condition during the removal by burning of exhaust particulates, restriction is made to the drop in the flow rate of exhaust gases flowing into the exhaust particulate trapping means. Therefore, the cooling action of the exhaust particulate trapping means through heat exchange with the exhaust gases can be kept up to suppress the temperature rise of the exhaust particulate trapping means.

Preferably, the above engine exhaust particulate after-treatment system further comprises deceleration detecting means for detecting a deceleration condition of the engine, and operating condition detecting means for detecting an operating condition of the engine in which the exhaust gases are in such a high temperature range that the exhaust particulates trapped by the exhaust particulate trapping means can be removed by burning, and is configured to restrict, on the detection of the deceleration condition of the engine when the engine operating condition in which the exhaust gases are in the high temperature range is detected, the drop of the flow rate of exhaust gases flowing into the exhaust particulate trapping means.

With this structure, even when the engine enters a deceleration condition while it is in an operating condition in which the exhaust gases are in the range of high temperatures and the exhaust particulates are removed by burning, the cooling action of the exhaust particulate trapping means through heat exchange with the exhaust gases is kept up, which suppresses the temperature rise of the exhaust particulate trapping means.

Preferably, the engine exhaust particulate after-treatment system further comprises exhaust particulate amount detecting means for directly or indirectly detecting the amount of exhaust particulate trapped by the exhaust particulate trapping means, regeneration means for removing exhaust particulates trapped by the exhaust particulate trapping means by burning when the amount of exhaust particulate detected by the exhaust particulate amount detecting means reaches a predetermined value, and deceleration detecting means for detecting a deceleration condition of the engine, and is configured to restrict, when a deceleration condition of the engine is detected during the removal by burning of exhaust particulates by the regeneration means, the drop of the flow rate of exhaust gases flowing into the exhaust particulate trapping means.

With this structure, even when the engine enters a deceleration condition while the exhaust particulates are removed by burning by the action of the regeneration means, the cooling action of the exhaust particulate trapping means through heat exchange with the exhaust gases is kept up, which suppresses the temperature rise of the exhaust particulate trapping means on engine deceleration.

More preferably, the engine exhaust particulate after-treatment system further comprises an exhaust gas recirculation path for communicating part of the exhaust path upstream of the exhaust particulate trapping means with an intake path of the engine, an exhaust gas recirculation valve disposed in the exhaust gas recirculation path, exhaust gas recirculation amount setting means for setting the amount of recirculation of exhaust gases through the exhaust gas recirculation valve according to the operating condition of the engine, and exhaust gas recirculation amount compensation means for compensating for the amount of recirculation of exhaust gases set by the exhaust gas recirculation amount setting means, wherein the exhaust flow rate drop restriction means is formed by the exhaust gas recirculation amount compensation means, and when a deceleration condition of the engine is detected by the deceleration detecting means during the removal by burning of exhaust particulates, the exhaust gas recirculation amount compensation means subtractively compensates for the amount of recirculation of exhaust gases set by the exhaust gas recirculation amount setting means.

With this structure, even when the engine enters a deceleration condition during the removal by burning of exhaust particulates, the amount of recirculation of exhaust gases is controlled to reduce it. The rate of the amount of exhaust gases supplied to the exhaust particulate trapping means with respect to the total amount of exhaust gases emitted from the engine can be increased. Therefore, the drop of the amount of exhaust gases supplied to the exhaust particulate trapping means is restricted, which suppresses the temperature rise of the exhaust particulate trapping means on engine deceleration.

As can be seen from the above, the following engine exhaust particulate after-treatment system is effective in attaining the first object of the present invention.

Namely, the engine exhaust particulate after-treatment system comprises:

a filter provided in an exhaust path of an engine for trapping particulates in exhaust gases;

a sensor for detecting the amount of exhaust particulate trapped by the filter;

an exhaust gas recirculation path for communicating part of the exhaust path upstream of the filter with an intake path of the engine;

an exhaust gas recirculation valve disposed in the exhaust gas recirculation path;

an injector for injecting fuel directly into a combustion chamber of the engine;

a deceleration sensor for detecting a deceleration condition of the engine; and a control unit for controlling the operations of the injector and the exhaust gas recirculation valve using a computer, wherein the control unit controls the injector to carry out a main injection of fuel in the vicinity of the top dead center on the compression stroke to obtain engine power, wherein when the amount of exhaust particulate detected by the sensor reaches a predetermined value, the control unit controls the injector to carry out a post-injection of fuel after the main injection to raise the temperature of exhaust gases for the burning of exhaust particulates trapped by the filter, wherein the control unit sets the amount of recirculation of exhaust gases according to the operating condition of the engine to operate the exhaust gas recirculation valve; and wherein when a deceleration condition of the engine is detected by the deceleration sensor during the execution of the post-injection, the control unit compensates for the set amount of recirculation of exhaust gases subtractively to control the exhaust gas recirculation valve to restrict the drop of the flow rate of exhaust gases flowing into the filter.

Preferably, the engine exhaust particulate after-treatment system further comprises an intake throttle valve disposed in an intake path of the engine, intake throttle valve opening setting means for setting the opening of the intake throttle valve according to the operating condition of the engine, and intake throttle valve opening compensation means for compensating for the opening of the intake throttle valve set by the intake throttle valve opening setting means, wherein the exhaust flow rate drop restriction means is formed by the intake throttle valve opening compensation means, and when a deceleration condition of the engine is detected by the deceleration detecting means during the removal by burning of exhaust particulates, the intake throttle valve opening compensation means compensates for the opening of the intake throttle valve, which is controlled according to the engine operating condition, to become wider.

With this structure, even when the engine enters a deceleration condition during the removal by burning of exhaust particulates, the opening angle of the intake throttle valve is controlled to be a greater degree. Therefore, the amount of air taken into the engine is increased to restrict the drop of the flow rate of exhaust gases, which suppresses the temperature rise of the exhaust particulate trapping means.

The exhaust flow rate drop restriction means may be formed by the exhaust gas recirculation amount compensation means and the intake throttle valve opening compensation means.

Preferably, the engine exhaust particulate after-treatment system further comprises fuel injection means for injecting fuel into a combustion chamber of the engine, fuel injection cutoff means for cutting off fuel injection of the fuel injection means when a deceleration condition of the engine is detected by the deceleration detecting means, and fuel injection cutoff inhibition means for inhibiting the operation of the fuel injection cutoff means, wherein the exhaust flow rate drop restriction means is formed by the fuel injection cutoff inhibition means, and when a deceleration condition of the engine is detected by the deceleration detecting means during the removal by burning of exhaust particulates, the fuel injection cutoff inhibition means inhibits the fuel injection cutoff means from cutting off fuel injection.

With this structure, even when the engine enters a deceleration condition during the removal by burning of exhaust particulates, the cutoff of fuel injection is inhibited. It is therefore prevented that the engine speed decreases, i.e., that the amount of air taken into the engine is reduced. As a result, the drop of the flow rate of exhaust gases is restricted, which suppresses the temperature rise of the exhaust particulate trapping means on engine deceleration.

The exhaust flow rate drop restriction means may be formed by at least one of the exhaust gas recirculation amount compensation means and the intake throttle valve opening compensation means, and the fuel injection cutoff inhibition means.

Preferably, the engine exhaust particulate after-treatment system further comprises an automatic transmission, gear ratio setting means for setting the gear ratio of the automatic transmission based on predetermined shift lines according to the running conditions of a vehicle, and shift line compensation means for compensating for the shift lines of the gear ratio setting means, wherein the exhaust flow rate drop restriction means is formed by the shift line compensation means, and when a deceleration condition of the engine is detected by the deceleration detecting means during the removal by burning of exhaust particulates, the shift line compensation means compensates for the shift lines of the gear ratio setting means to a higher vehicle speed side.

With this structure, even when the engine enters a deceleration condition during the removal by burning of exhaust particulates, the shift lines are compensated for to a higher vehicle speed side so that the engine speed increases and therefore the amount of air taken into the engine is increased, or the engine speed is kept up. As a result, the drop of the flow rate of exhaust gases is restricted, which suppresses the temperature rise of the exhaust particulate trapping means on engine deceleration.

The exhaust flow rate drop restriction means may be formed by at least one of the exhaust gas recirculation amount compensation means, the intake throttle valve opening compensation means and the fuel injection cutoff inhibition means, and the shift line compensation means.

Preferably, the engine exhaust particulate after-treatment system further comprises an automatic transmission, gear ratio setting means for setting the gear ratio of the automatic transmission based on predetermined shift lines according to the running conditions of a vehicle, and gear ratio compensation means for compensating for the gear ratio set by the gear ratio setting means, wherein the exhaust flow rate drop restriction means is formed by the gear ratio compensation means, and when a deceleration condition of the engine is detected by the deceleration detecting means during the removal by burning of exhaust particulates, the gear ratio compensation means compensates for the gear ratio set by the gear ratio setting means to a lower-speed stage side.

With this structure, even when the engine enters a deceleration condition during the removal by burning of exhaust particulates, the gear stage is compensated for to a lower-speed stage side so that the engine speed increases and therefore the amount of air taken into the engine is increased. As a result, the drop of the flow rate of exhaust gases is restricted, which suppresses the temperature rise of the exhaust particulate trapping means on engine deceleration.

The exhaust flow rate drop restriction means may be formed by at least one of the exhaust gas recirculation amount compensation means, the intake throttle valve opening compensation means and the fuel injection cutoff inhibition means, and the gear ratio compensation means.

Preferably, the engine exhaust particulate after-treatment system further comprises an automatic transmission, slip amount setting means for setting the slip amount between input and output members of a fluid coupling equipped with the automatic transmission according to the running conditions of a vehicle, and slip amount compensation means for compensating for the slip amount set by the slip amount setting means, wherein the exhaust flow rate drop restriction means is formed by the slip amount compensation means, and when a deceleration condition of the engine is detected by the deceleration detecting means during the removal by burning of exhaust particulates, the slip amount compensation means additively compensates for the slip amount set by the slip amount setting means.

With this structure, even when the engine enters a deceleration condition during the removal by burning of exhaust particulates, the slip amount between input and output members of the fluid coupling is compensated for to become greater. Thus, the engine speed increases and therefore the amount of air taken into the engine is increased. As a result, the drop of the flow rate of exhaust gases is restricted, which suppresses the temperature rise of the exhaust particulate trapping means.

To attain the second-mentioned object, the present invention is directed to a computer program for use in an engine exhaust particulate after-treatment system comprising exhaust particulate trapping means provided in an exhaust path of an engine for trapping particulates in exhaust gases, and flow rate control means for controlling the flow rate of exhaust gases flowing into the exhaust particulate trapping means, and characterized by the features described below. The computer program having the below-described features is useful, when the engine has fallen into a deceleration condition while it is in an operating condition in which the exhaust gases are in the range of high temperatures and the exhaust particulates are being removed by burning, for restricting the drop of the flow rate of exhaust gases flowing into the exhaust particulate trapping to keep up the cooling action thereof through heat exchange with the exhaust gases, thereby suppressing the temperature rise of the exhaust particulate trapping means.

Namely, the computer program is characterized by allowing a computer to execute:

a first step of determining whether or not the engine is in an operating condition in which the exhaust gases are within such a high temperature range that the exhaust particulates trapped by the exhaust particulate trapping means can be removed by burning;

a second step of determining whether or not the operating condition of the engine is in a deceleration condition; and a third step of activating the flow rate control means so that when the engine is in an operating condition in which the exhaust gases are within the high temperature range and in a deceleration condition, the drop of the flow rate of exhaust gases flowing into the exhaust particulate trapping means is restricted.

Furthermore, the present invention is directed to a computer program for use in an engine exhaust particulate after-treatment system comprising exhaust particulate trapping means provided in an exhaust path of an engine for trapping particulates in exhaust gases, exhaust particulate amount detecting means for directly or indirectly detecting the amount of exhaust particulate trapped by the exhaust particulate trapping means, removal-by-burning means for removing exhaust particulates trapped by the exhaust particulate trapping means by burning, and flow rate control means for controlling the flow rate of exhaust gases flowing into the exhaust particulate trapping means, and characterized by the features described below. The computer program having the below-described features is useful, when the engine has fallen into a deceleration condition while the exhaust particulates are being removed by burning, for keeping up the cooling action of the exhaust particulate trapping means through heat exchange with the exhaust gases, thereby suppressing the temperature rise of the exhaust particulate trapping means.

Namely, the computer program is characterized by allowing a computer to execute:

a first step of determining whether or not the amount of exhaust particulate detected by the exhaust particulate amount detecting means reaches a predetermined value;

a second step of activating the removal-by-burning means when the amount of exhaust particulate reaches the predetermined value;

a third step of determining whether or not the operating condition of the engine is in a deceleration condition; and a fourth step of activating the flow rate control means so that when it has been determined in the third step that the operating condition of the engine is in a deceleration condition while the removal-by-burning means is activated in the second step, the drop of the flow rate of exhaust gases flowing into the exhaust particulate trapping means is restricted.

DESCRIPTION OF THE PREFERRED EMBODIMENTS

Hereinafter, description will be made about embodiments of the present invention with reference to the drawings.

Figure 1:
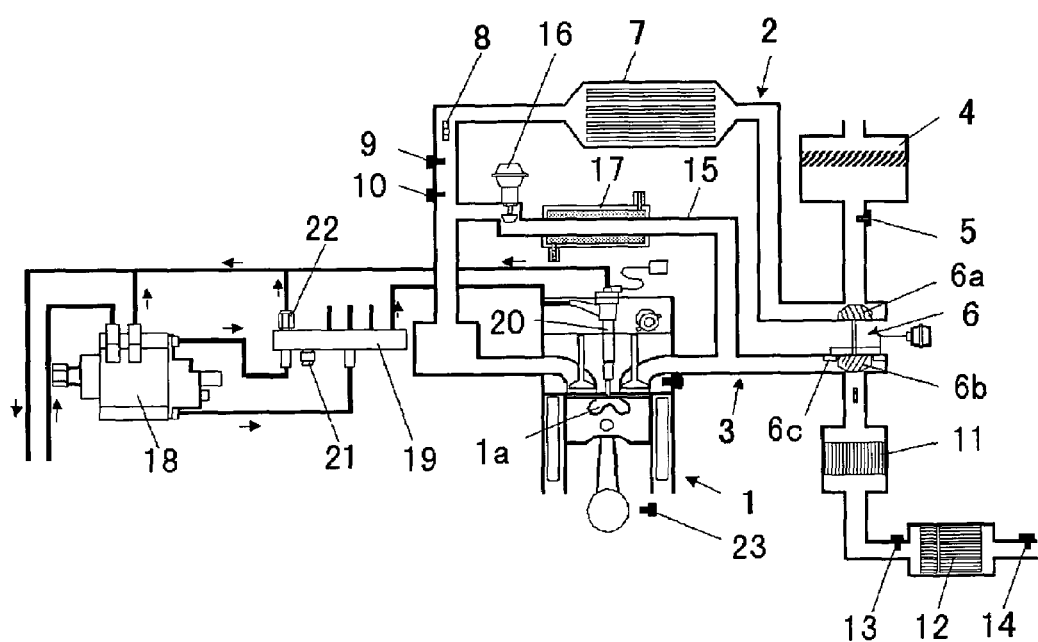
FIG. 1 is a diagram showing the entire configuration of an engine exhaust particulate after-treatment system which is common to embodiments of the present invention.

FIG. 1 shows the entire configuration of an engine exhaust particulate after-treatment system which is common to embodiments of the present invention. In the figure, the reference numeral 1 denotes a multi-cylinder (e.g., four-cylinder) diesel engine. The diesel engine 1 is connected with an intake path 2 and an exhaust path 3.

In the intake path 2, in the order proceeding from its upstream to downstream side, an air cleaner 4, an airflow sensor 5, a blower 6a of a variable geometry turbocharger (VGT) 6, an inter-cooler 7, an intake throttle valve 8, an intake temperature sensor 9 and an intake pressure sensor 10 are disposed.

In the exhaust path 3, in the order proceeding from its upstream to downstream side, a turbine 6b of the VGT 6, a movable vane 6c for controlling the flow rate of exhaust gases flowing into the turbine 6b, an oxidation catalyst 11 and a particulate filter 12 are disposed.

On the upstream and downstream sides of the particulate filter 12, exhaust pressure sensors 13 and 14 as exhaust particulate amount sensors are disposed, respectively, to detect the amount of exhaust particulate accumulated on the particulate filter 12 based on the differential pressure between the exhaust pressure sensors 13 and 14.

Furthermore, an exhaust gas recirculation path (EGR path) 15 is provided to connect the intake path 2 with the exhaust path 3. The EGR path 15 is provided partway with a vacuum-actuated exhaust gas recirculation valve (EGR valve) 16 and a cooler 17 for cooling exhaust gases using a cooling water for the engine.

The reference numeral 18 denotes a fuel injection pump for supplying fuel from a fuel tank (not shown) to a common rail 19 functioning as a pressure storage.

The common rail 19 is connected to fuel injection valves (injectors) 20 disposed in combustion chambers 1a of the individual cylinders (only one shown in FIG. 1), and is provided with a fuel injection pressure sensor 21, and a safety valve 22 for opening itself to relieve fuel pressure toward the fuel tank when the fuel pressure stored in the common rail 19 exceeds the maximum allowable level.

The reference numeral 23 denotes a crank angle sensor which acts as a deceleration sensor for detecting a deceleration condition of the engine, and the crank angle sensor 23 is arranged to detect the engine speed.

Embodiment 1

Figure 2:
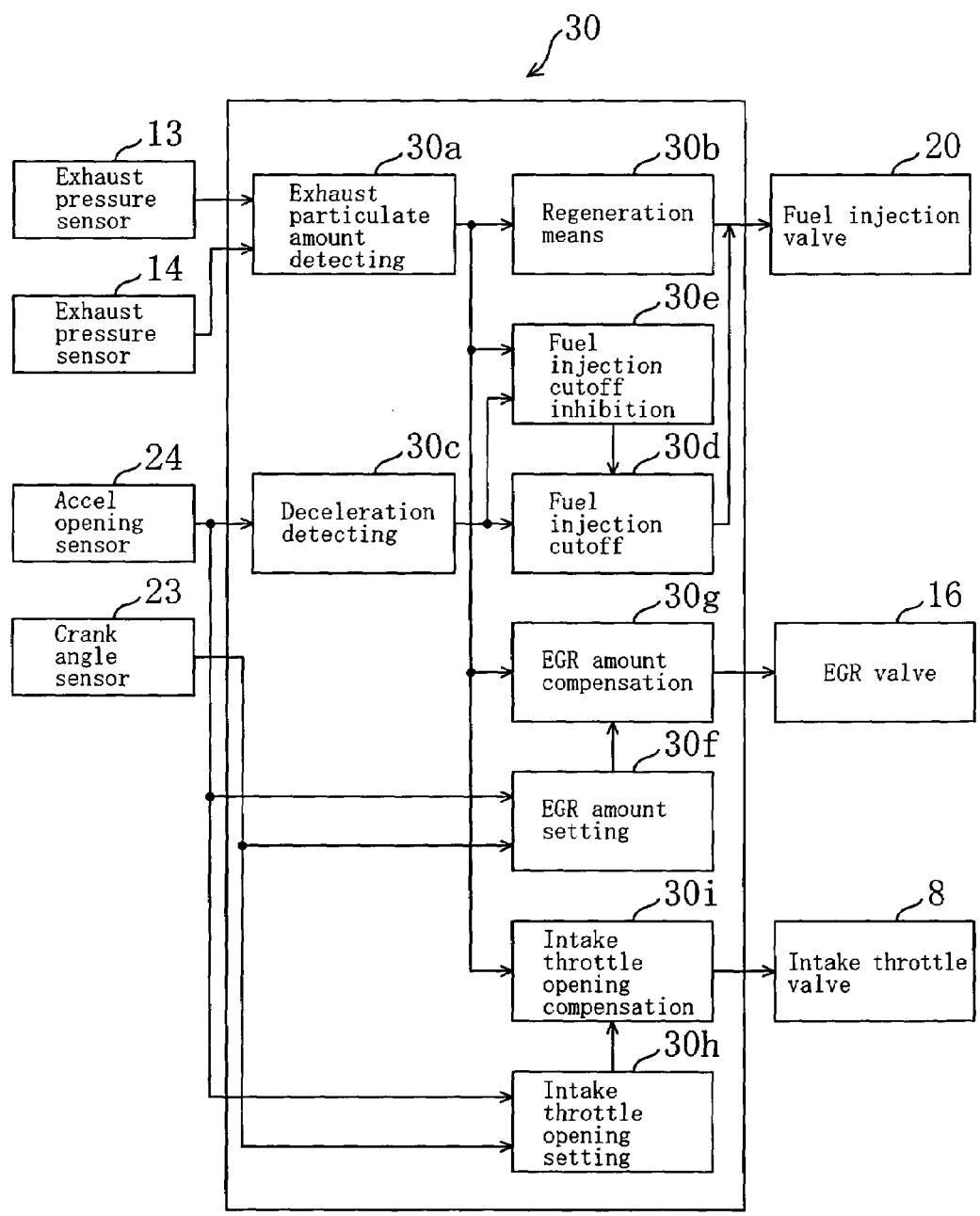
FIG. 2 is a control block diagram in Embodiment 1 of the present invention.

FIG. 2 is a control block diagram in Embodiment 1, and shows a case of restricting, when the engine operating condition changes to a deceleration condition during the removal by burning of exhaust particulates, the drop of the flow rate of exhaust gases flowing into the particulate filter 12. The controls in this case include: (a) compensating for the amount of recirculation of exhaust gases (EGR amount) subtractively; (b) compensating for the opening angle of the intake throttle valve 8 to become wider; and (c) inhibiting fuel injection cutoff during deceleration.

Detection signals from the exhaust pressure sensors 13 and 14, the crank angle sensor 23 and an accel opening sensor 24 are input to an engine control unit 30 for controlling the intake throttle valve 8, the EGR valve 16 and the fuel injection valve 20.

First, description will be made about fuel injection control.

The engine control unit 30 is provided with an exhaust particulate amount detecting means 30a for detecting the amount of exhaust particulate trapped by the particulate filter 12.

The exhaust particulate amount detecting means 30a is configured to detect the amount of exhaust particulate based on the differential pressure between exhaust pressures upstream and downstream of the particulate filter 12.

Specifically, when the amount of exhaust particulate trapped is increased, the exhaust pressure upstream of the particulate filter 12 becomes higher and in turn the differential pressure becomes higher. Therefore, the exhaust particulate amount detecting means 30a detects the amount of exhaust particulate trapped by the particulate filter 12 based on the differential pressure.

A regeneration means (exhaust particulate removal-by-burning means) 30b shown in FIG. 2 is configured to execute, when the amount of exhaust particulate detected by the exhaust particulate amount detecting means 30a reaches a first predetermined value equivalent to a saturation amount for the particulate filter 12, not only a main injection in which fuel is injected in the vicinity of the top dead center on the compression stroke but also a post-injection in which fuel is injected on the expansion stroke after the main injection to remove exhaust particulates by burning and thereby regenerate the particulate filter 12.

In other words, the regeneration means 30b allows the post-injected fuel to afterburn in the exhaust path 3 to raise the exhaust gas temperature, resulting in the removal by burning of exhaust particulates trapped by the particulate filter 12.

Figure 3:
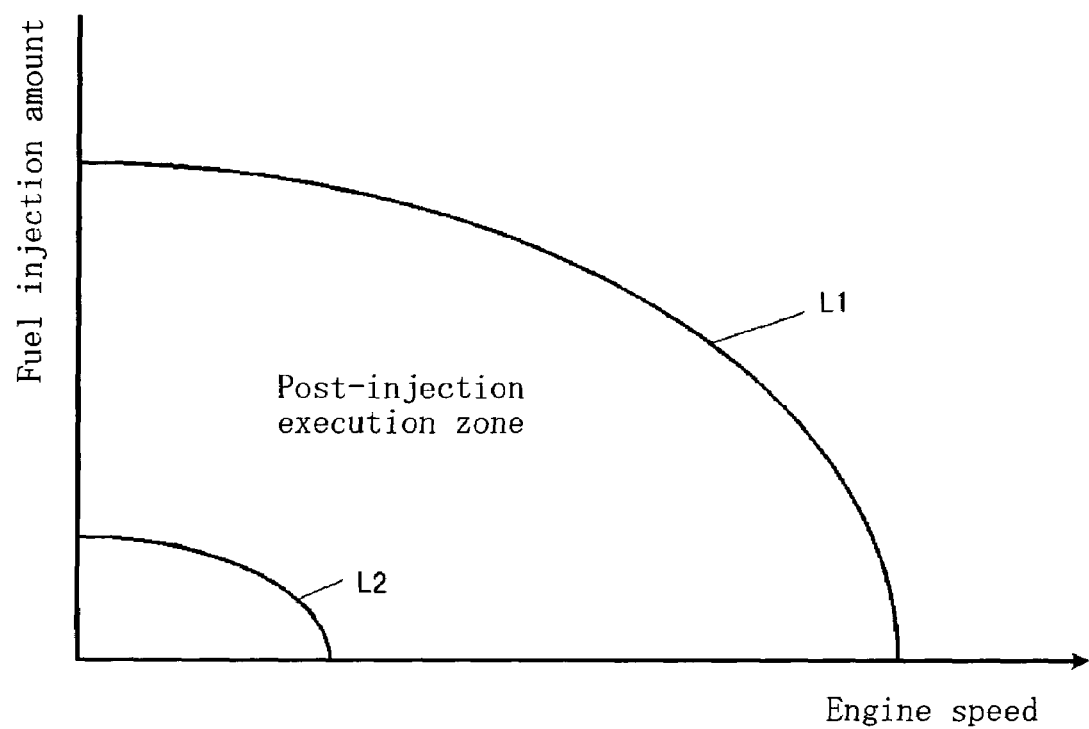
FIG. 3 is a post-injection timing map common to embodiments of the present invention.

The post-injection, as shown in FIG. 3, is carried out only in a post-injection execution zone defined by the preset curves L1 and L2. More specifically, the operating zone outside of the preset curve L1 is a naturally regenerable zone where the engine speed and load are high and the exhaust gas temperature is originally high. In this zone, execution of post-injection is inhibited because it invites excessively high exhaust gas temperature by contrast to have an adverse effect on the thermal endurance of exhaust system elements. On the other hand, the operating zone inside of the preset curve L2 is the zone where the engine speed and load are low and the exhaust gas temperature is low. In this zone, even if post-injection is executed, the exhaust gas temperature will not reach the temperature at which exhaust particulates can burn. Therefore, post-injection is inhibited to suppress deterioration in fuel economy.

Furthermore, the engine control unit 30 is provided with a deceleration detecting means 30c for detecting a deceleration condition of the engine based on the amount of change in accel opening, a fuel injection cutoff means 30d for cutting off fuel injection of the fuel injection valve 20 when the deceleration detecting means 30c detects a deceleration condition, and a fuel injection cutoff inhibition means 30e for inhibiting fuel injection cutoff of the fuel injection cutoff means 30d when a deceleration condition is detected while the regeneration means 30b is regenerating the particulate filter 12.

Next, description will be made about the control of the EGR amount.

The engine control unit 30 is further provided with an exhaust gas recirculation amount setting means (EGR amount setting means) 30f for setting the EGR amount with reference to a map plotted between engine speed and fuel injection amount (which is calculated based on the accel opening and the engine speed), and an exhaust gas recirculation amount compensation means (EGR amount compensation means) 30g for compensating for the EGR amount set by the EGR amount setting means 30f by subtracting some given amount from the set EGR amount when a deceleration condition is detected by the deceleration detecting means 30c. The map is plotted by previously assigning optimal EGR amounts according to engine speed and fuel injection amount.

Next, description will be made about the control of the intake throttle valve 8.

The engine control unit 30 is further provided with an intake throttle valve opening setting means 30h for setting the opening angle of the intake throttle valve 8 with reference to a map plotted between engine speed and fuel injection amount, and an intake throttle valve opening compensation means 30i for additively compensating for the opening angle of the intake throttle valve 8 set by the intake throttle valve opening setting means 30h to become wider by some given value when a deceleration condition has been detected by the deceleration detecting means 30c. The map is plotted by previously assigning optimal opening angles of the intake throttle valve according to engine speed and fuel injection amount.

Next, description will be made about the controls of the fuel injection valve 20, the EGR valve 16, and the intake throttle valve 8 with reference to the flow chart in FIG. 4.

Figure 4:
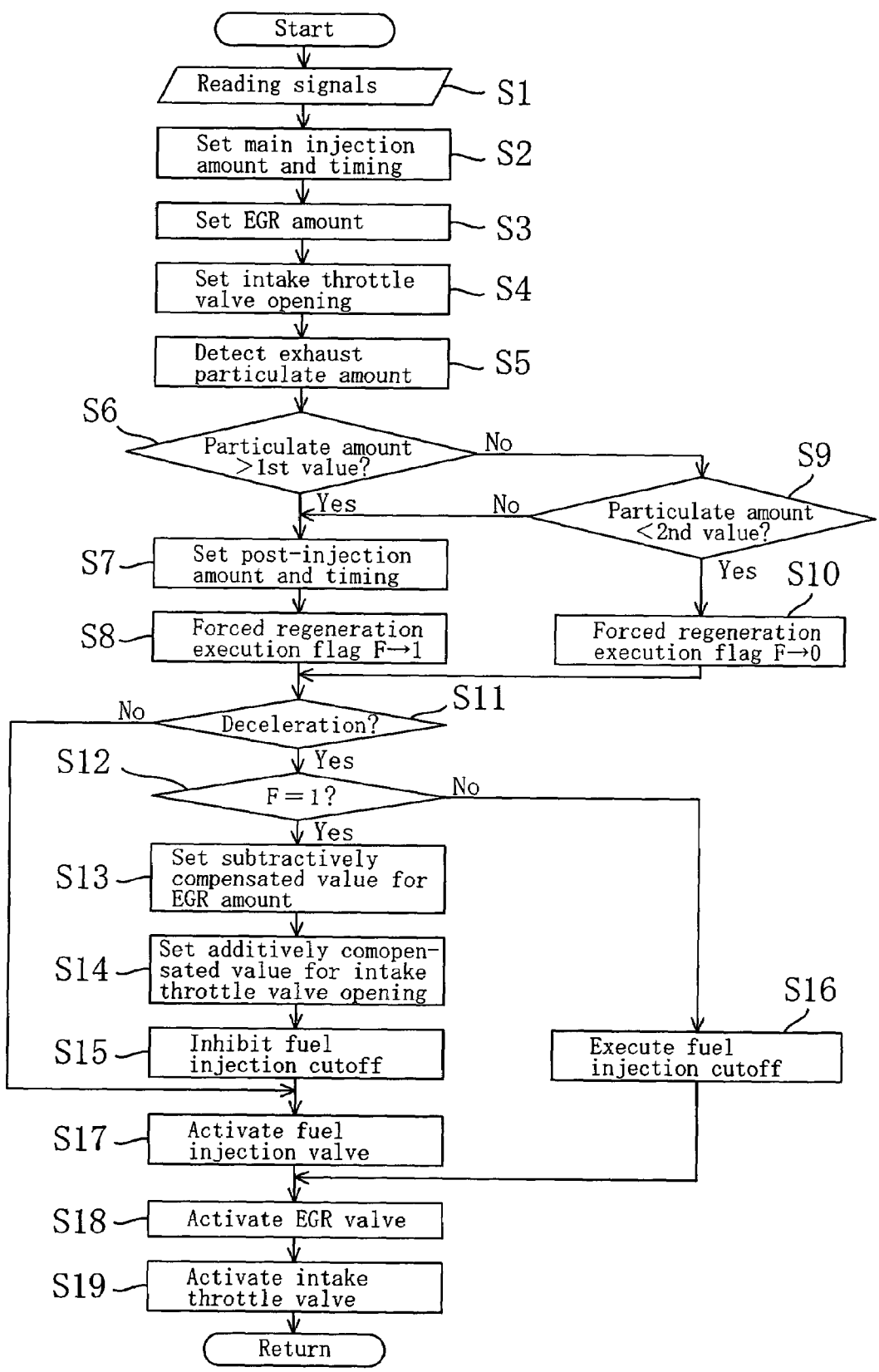
FIG. 4 is a control flow chart in Embodiment 1 of the present invention.

In step S1 of FIG. 4, detection signals from various sensors such as the exhaust pressure sensors 13 and 14, the fuel injection pressure sensor 21, the crank angle sensor 23 and the accel opening sensor 24 are read.

In step S2, the main injection amount of fuel injected in the vicinity of the top dead center on the compression stroke is set by referring to a main injection amount map based on the engine speed and the accel opening, and the main injection timing is set by referring to a main injection timing map based on the engine speed and the fuel injection amount. The main injection amount map is plotted by previously assigning optimal main injection amounts according to engine speed and accel opening. The main injection timing map is plotted by previously assigning optimal main injection timings according to engine speed and fuel injection amount.

In step S3, the EGR amount is set by referring to the related map based on the engine speed and the fuel injection amount. In this map, the EGR amounts are assigned to become larger as the engine speed is decreased or as the fuel injection amount is reduced.

In step S4, the opening angle of the intake throttle valve is set by referring to the related map based on the engine speed and the fuel injection amount. In this map, the opening angles of the intake throttle valve are assigned to become smaller (to approach its closed position) as the engine speed is decreased or as the fuel injection amount is reduced.

In step S5, the amount of exhaust particulate trapped by the particulate filter 12 is detected based on the differential pressure between the exhaust pressure sensors 13 and 14.

In step S6, it is determined whether or not the amount of exhaust particulate detected in step S5 is above a first predetermined value equivalent to the saturation amount for the particulate filter 12.

If the determination in step S6 is YES, i.e., if the particulate filter 12 has trapped exhaust particulates to an extent equivalent to its saturation amount, it is necessary to remove the exhaust particulates by burning and thereby regenerate the particulate filter 12. In this case, the program proceeds to step S7 wherein the post-injection amount and post-injection timing (here, both fixed values) are set, and then proceeds to step S8 wherein a forced regeneration execution flag F is set at 1.

If the determination in step S6 is NO, the program proceeds to step S9 wherein it is determined whether or not the amount of exhaust particulate is below a second predetermined value (the value set to be smaller than the first predetermined value, e.g., a value near to zero).

If the determination in step S9 is NO, this shows that the amount of exhaust particulate trapped is still large. In this case, the program proceeds to step S7 wherein the post-injection amount and post-injection timing are set as described above.

If the determination in step S9 is YES, i.e., if the particulate filter 12 is regenerated sufficiently, the program proceeds to step S10, without setting the post-injection amount and timing, in which the forced regeneration execution flag F is set at 0.

In step S11, it is determined whether or not the engine enters a deceleration condition. If the determination is YES, the program proceeds to step S12 wherein it is determined whether or not the forced regeneration execution flag F is set at 1.

If the determination in step S12 is YES, i.e., when the operating condition changes to a deceleration condition during the removal by burning of exhaust particulates, the program proceeds to steps S13, S14 and S15 in this order to execute the process for restricting the drop of the flow rate of exhaust gases flowing into the particulate filter 12.

To be more specific, in step S13, the subtractive compensated value for the EGR amount (here, a fixed value regardless of any operating conditions) is first set. Thus, in the total flow rate of exhaust gases emitted from the engine, the amount of exhaust gases recirculated to the intake path 2 is reduced. Therefore, the flow rate of exhaust gases flowing into the particulate filter 12 can be increased by the reduced EGR amount.

In step S14, the additive compensated value for the opening angle of the intake throttle valve 8 (here, a fixed value regardless of any operating conditions) is set. Thus, the amount of air taken into the engine is increased. Therefore, the flow rate of exhaust gases emitted from the engine can be increased by the increased air amount.

In step S15, fuel injection cutoff during engine deceleration is inhibited. This restricts drop in engine speed during deceleration to increase the amount of air taken into the engine. Therefore, the flow rate of exhaust gases emitted from the engine can be increased accordingly.

If the determination in step S12 is NO, the program proceeds to step S16, without compensating for the EGR amount and the opening angle of the intake throttle valve 8, in which fuel injection cutoff during engine deceleration is carried out.

If the determination in step S11 is NO, the program proceeds to step S17 without executing the procedures in steps S13 to S15.

In step S17, the fuel injection valve 20 is activated such that main fuel injection is carried out according to the main injection amount and main injection timing set in step S2, or such that when the post-injection amount and post-injection timing have been set in step S7, post-injection is additionally carried out.

In step S18, the EGR valve 16 is activated to provide a final EGR amount determined based on the EGR amount set in step S3 and the subtractive compensated value for the EGR amount set in the step S13.

In step S19, the actuator (not shown) for the intake throttle valve 8 is activated to provide a final opening angle of the intake throttle valve which is determined based on the intake throttle vale opening angle set in step S4 and the additive compensated value for the intake throttle valve opening set in step S14.

Figure 5:
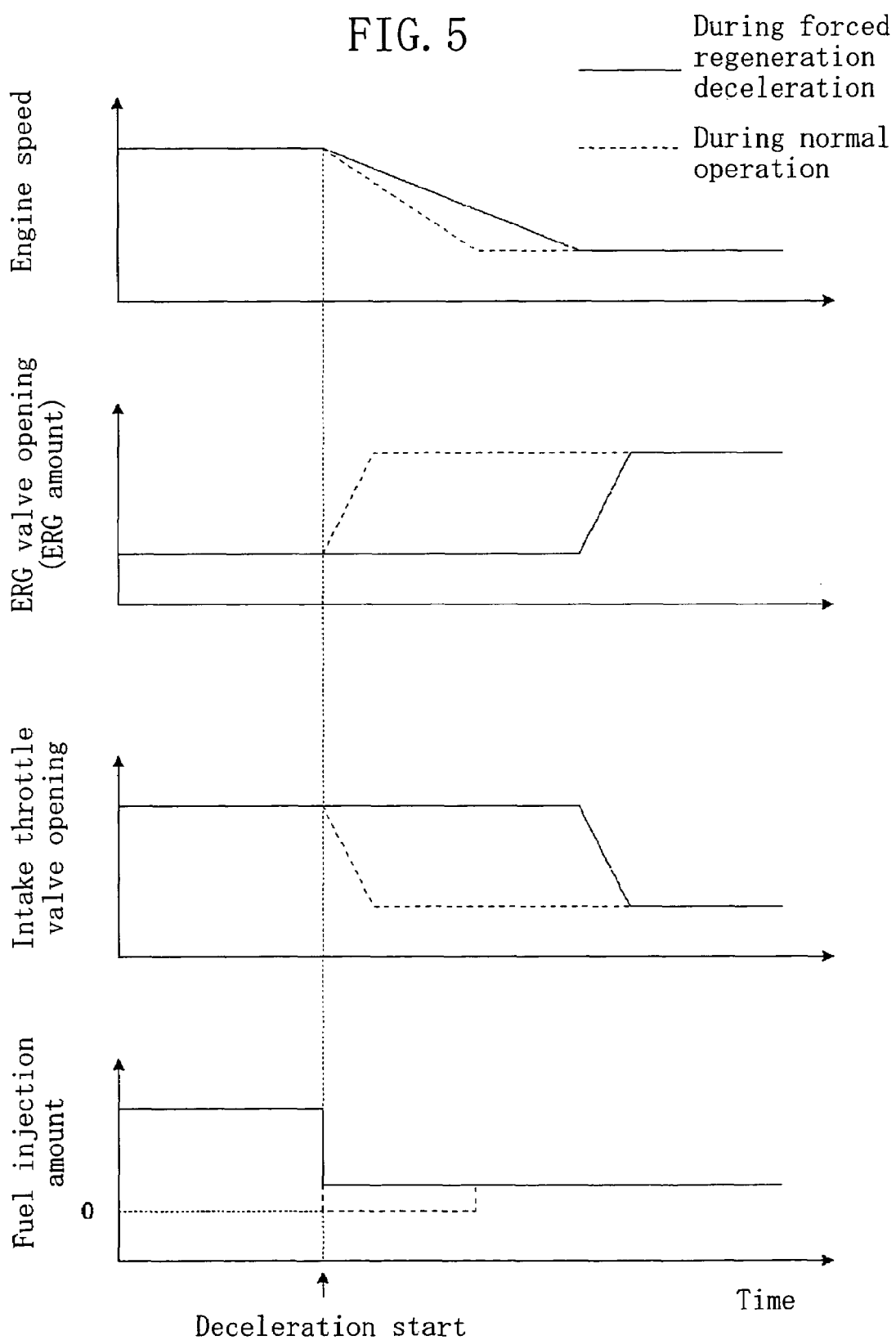
FIG. 5 is time charts in Embodiment 1 of the present invention.

According to Embodiment 1, as shown in the time chart of FIG. 5, when the engine enters a deceleration condition under the condition that exhaust particulates are being removed by burning, the opening angle of the EGR valve 16 is decreased to reduce the EGR amount as shown in the solid line in the chart. At the same time, the opening angle of the intake throttle valve 8 is increased as shown in the solid line in the chart, and fuel injection cutoff during deceleration is inhibited so that fuel is injected at the amount equivalent to that injected during idling as shown in the solid line in the chart. Thus, the drop of the flow rate of exhaust gases flowing into the particulate filter 12 can be restricted, resulting in suppression of temperature rise in the particulate filter 12.

Embodiment 2

Next, description will be made about Embodiment 2 of the present invention.

The phenomenon that the temperature of the particulate filter 12 rises on engine deceleration during the removal by burning of exhaust particulates equally arises not only on engine deceleration during a forced regeneration as described in Embodiment 1 but also on engine deceleration during a natural regeneration which is in the operating zone outside of the preset curve L1 referred to in the description of FIG. 3 and in which the engine speed and load are high and the exhaust gas temperature is originally high.

Embodiment 2 is the case of restricting, on engine deceleration during a natural regeneration, the drop of the flow rate of exhaust gases flowing into the particulate filter 12. The specific measures for restricting the drop of the flow rate of exhaust gases includes, like Embodiment 1, (a) compensating for the amount of recirculation of exhaust gases (EGR amount) subtractively, (b) compensating for the opening angle of the intake throttle valve 8 to become wider, and (c) inhibiting fuel injection cutoff during engine deceleration.

Description will be made below about the controls on the fuel injection valve 20, the EGR valve 16 and the intake throttle valve 8 with reference to the flow chart of FIG. 6.

Figure 6:
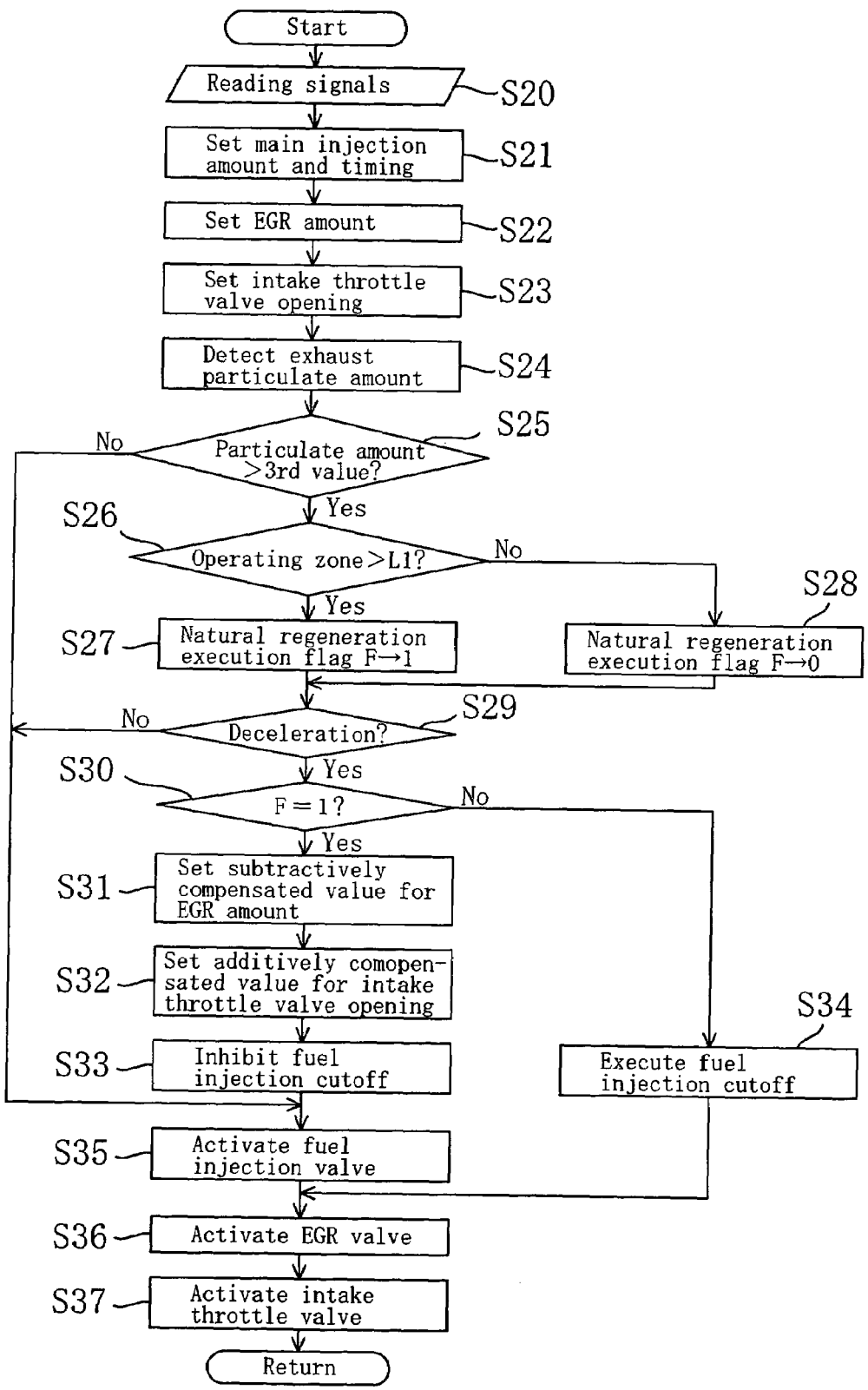
FIG. 6 is a control flow chart in Embodiment 2 of the present invention.

Steps S20 to S24 in FIG. 6 are the same as steps S1 to S5 in FIG. 4, and therefore the description of them will be omitted.

In step S25, it is determined whether or not the amount of exhaust particulate detected in step S24 is above a third predetermined value (the value set to be smaller than the first predetermined value but larger than the second predetermined value, each described in Embodiment 1), i.e., whether or not the conditions that a certain amount of exhaust particulate has been trapped and the temperature of the particulate filter 12 will rise by burning on engine deceleration hold true.

If the determination in step S25 is YES, the program proceeds to step S26 wherein it is determined whether or not the operating zone lies outside of the preset curve L1 shown in FIG. 3.

If the determination in step S26 is YES, i.e., when it has been determined that the operating condition lies in the natural regeneration zone, the program proceeds to step S27 wherein a natural regeneration flag F is set at 1. If the determination in step S26 is NO, the program proceeds to step S28 wherein the natural regeneration flag F is set at 0.

Subsequent steps S29 to S37 are the same as steps S11 to S19 in FIG. 4, and therefore the detailed description of them will be omitted. To sum up, when it has been determined the engine enters a deceleration condition under the condition that the natural regeneration flag F is set at 1, the program carries out the procedures in step S31 to S33 to reduce the EGR amount, increase the opening angle of the intake throttle valve 8 and inhibit fuel injection cutoff during deceleration, resulting in restricting the drop of the flow rate of exhaust gases flowing into the particulate filter 12.

According to Embodiment 2, even when the engine operating condition changes to a deceleration condition while in the natural regeneration zone outside of the preset curve L1 of FIG. 3 in which exhaust particulates are removed by burning, like the change to a deceleration condition during the forced regeneration, the EGR amount is reduced, the opening angle of the intake throttle valve 8 is increased and fuel injection cutoff on deceleration is inhibited. Thus, the drop of the flow rate of exhaust gases flowing into the particulate filter 12 can be restricted, resulting in suppression of the temperature rise of the particulate filter 12.

Embodiment 3

Next, description will be made about Embodiment 3 of the present invention.

Embodiment 3 is the case that when the engine enters a deceleration condition under the condition in which exhaust particulates are removed by burning, the shift lines for changing the gear ratio of an automatic transmission are compensated for to a higher vehicle speed side to increase the engine speed and in turn increase the amount of air taken into the engine, or to restrict the drop of the engine speed, resulting in restricting the drop of the flow rate of exhaust gases flowing into the particulate filter 12.

Figure 7:
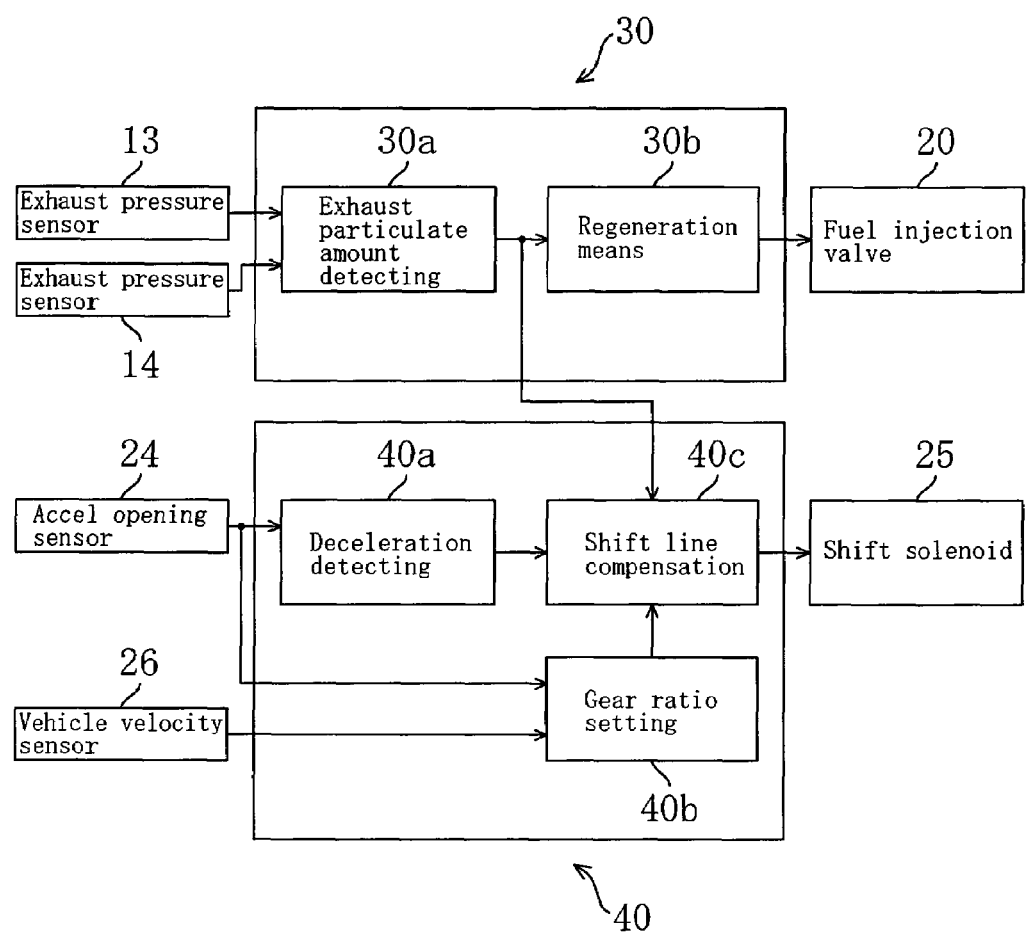
FIG. 7 is a control block diagram in Embodiment 3 of the present invention.

FIG. 7 is a control block diagram of Embodiment 3. As shown in the figure, the engine control unit 30 is provided, like Embodiments 1 and 2, with an exhaust particulate amount detecting means 30a and regeneration means 30b in order to control the fuel injection valve 20 to remove exhaust particulates by burning.

The exhaust particulate after-treatment system of this embodiment further includes an automatic transmission control unit 40. The automatic transmission control unit 40 receives detection signals of the accel opening sensor 24 and a vehicle speed sensor 26 for the control of a shift solenoid 25 for an automatic transmission (not shown).

The automatic transmission control unit 40 is provided with a deceleration detecting means 40a for detecting deceleration based on the amount of change in accel opening, a gear ratio setting means 40b for setting the gear ratio based on shift lines previously assigned according to accel opening and vehicle speed, and shift line compensation means 40c for compensating for the shift lines of the gear ratio setting means 40b to a higher vehicle speed side when a deceleration condition of the engine is detected by the deceleration detecting means 40a under the conditions that the amount of exhaust particulate detected by the exhaust particulate amount detecting means 30a has reached the first predetermined value or more and the exhaust particulates are being removed by burning.

Next, with reference to the flow chart of FIG. 8, the controls of the fuel injection valve 20 and the sift solenoid 25 will be described.

Figure 8:
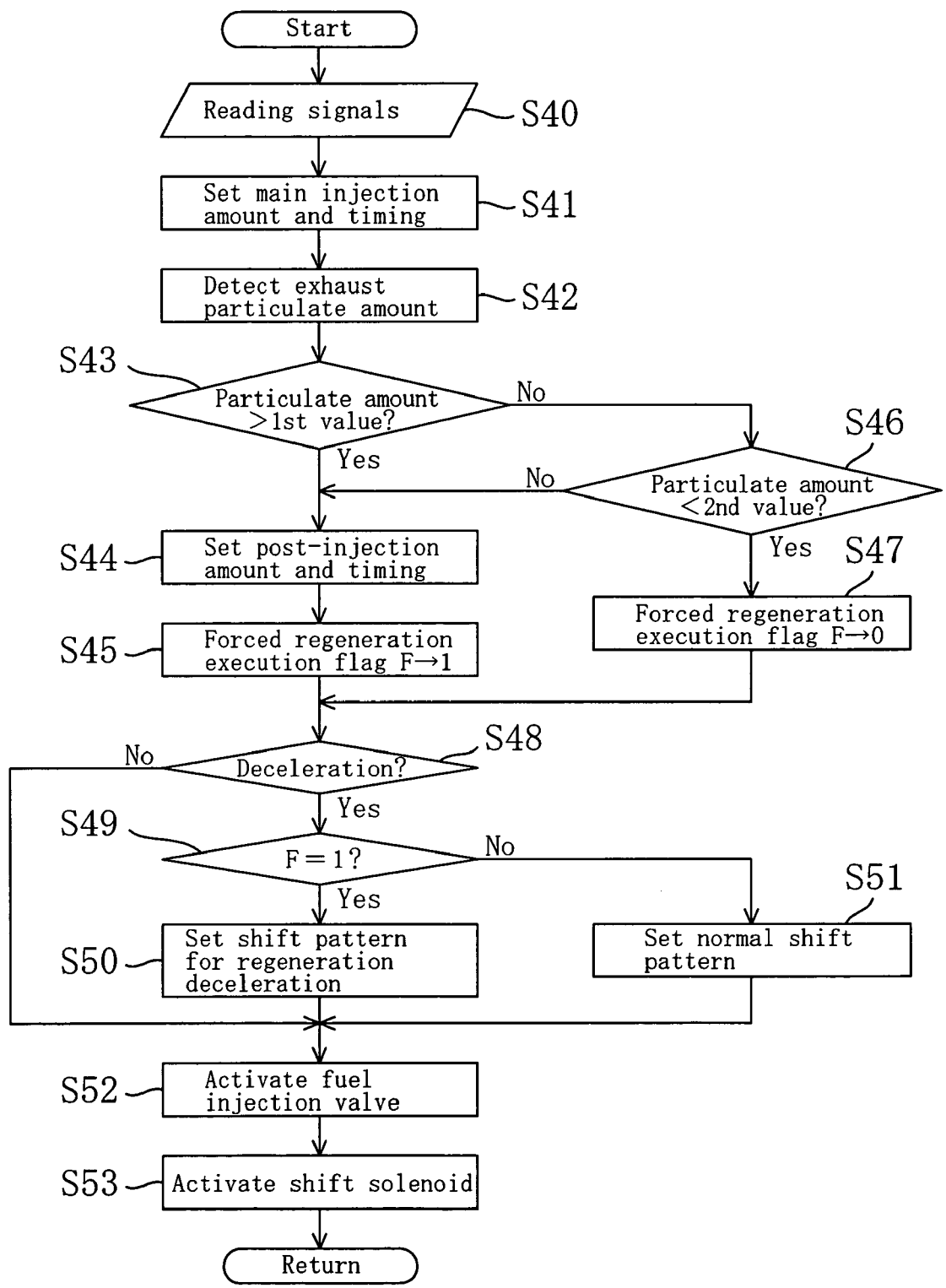
FIG. 8 is a control flow chart in Embodiment 3 of the present invention.

In step S40 of FIG. 8, detection signals from various sensors such as the exhaust pressure sensors 13 and 14, the accel opening sensor 24 and the vehicle speed sensor 25 are read.

In the subsequent step S41, the main injection amount of fuel injected in the vicinity of the top dead center on the compression stroke is set by referring to a main injection amount map based on the engine speed and the accel opening, and the main injection timing is set by referring to a main injection timing map based on the engine speed and the fuel injection amount.

In step S42, the amount of exhaust particulate trapped by the particulate filter 12 is detected based on the differential pressure between the exhaust pressure sensors 13 and 14.

In step S43, it is determined whether or not the amount of exhaust particulate detected in step S42 is above a first predetermined value equivalent to the saturation amount for the particulate filter 12.

If the determination in step S43 is YES, i.e., if the particulate filter 12 has trapped exhaust particulates to an extent equivalent to its saturation amount, it is necessary to remove the exhaust particulates by burning and thereby regenerate the particulate filter 12. In this case, the program proceeds to step S44 wherein the post-injection amount and post-injection timing (here, both fixed values) are set, and then proceeds to step S45 wherein a forced regeneration execution flag F is set at 1.

If the determination in step S43 is NO, the program proceeds to step S46 wherein it is determined whether or not the amount of exhaust particulate is below a second predetermined value (the value set to be smaller than the first predetermined value, e.g., a value near to zero).

If the determination in step S46 is NO, this shows that the amount of exhaust particulate trapped is still large. In this case, the program proceeds to step S44 wherein the post-injection amount and post-injection timing are set as described above.

If the determination in step S46 is YES, i.e., if the particulate filter 12 is generated sufficiently, the program proceeds to step S47, without setting the post-injection amount and timing, in which the forced regeneration execution flag F is set at 0.

In the subsequent step S48, it is determined whether or not the engine enters a deceleration condition.

If the determination in step S48 is YES, the program proceeds to step S49 wherein it is determined whether or not the forced regeneration execution flag F is set at 1.

Figure 9A:
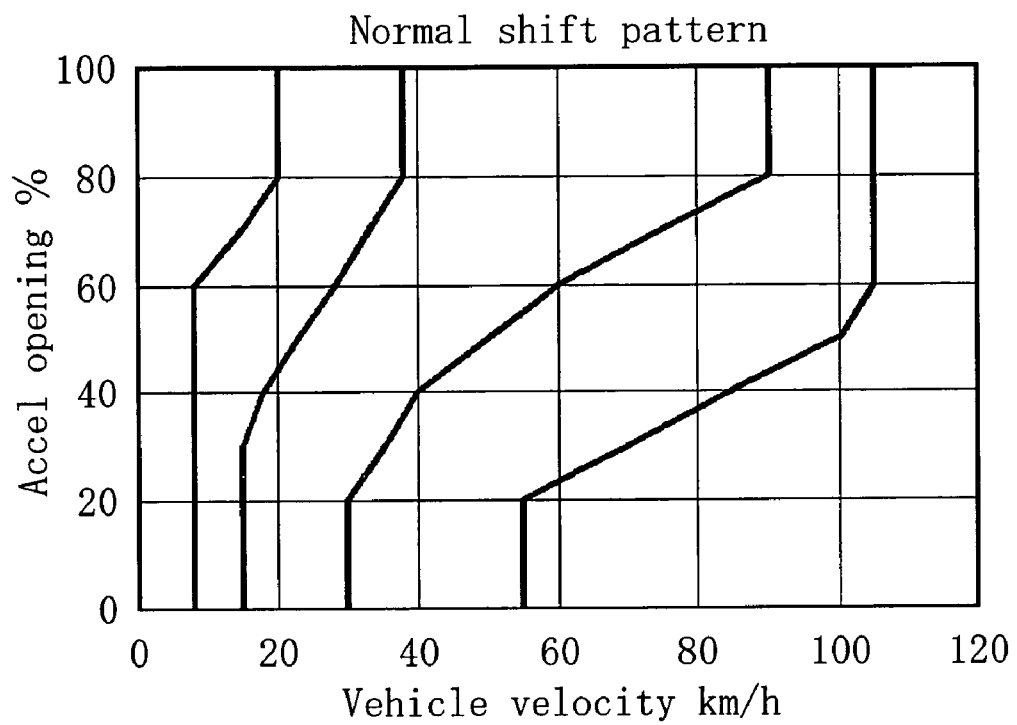
FIG. 9 is graphs respectively showing a normal shift pattern and a shift pattern for regeneration deceleration in Embodiment 3 of the present invention.
Figure 9B:
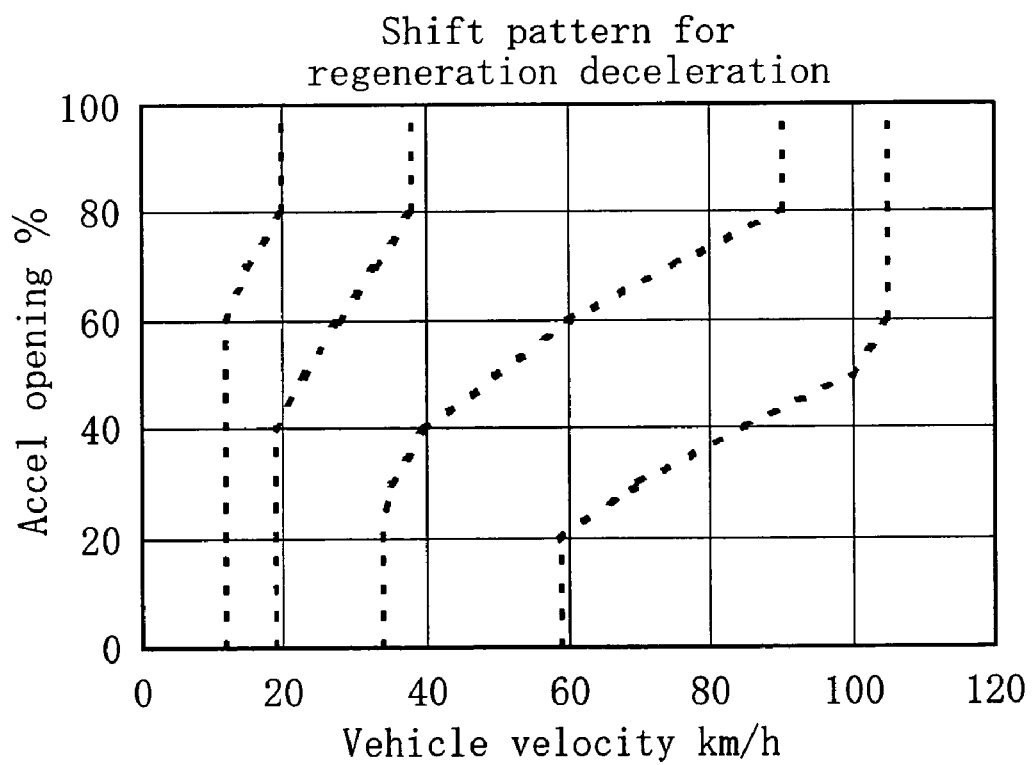

If the determination in step S49 is YES, i.e., when the engine operating condition shifts to a deceleration condition during the removal by burning of exhaust particulates, the program proceeds to step S50 wherein a shift pattern for regeneration deceleration shown in FIG. 9B is set as a shift pattern for the automatic transmission.

On the other hand, if the determination in step S49 is NO, the program proceeds to step S51 wherein a normal shift pattern shown in FIG. 9A is set as a shift pattern for the automatic transmission.

If the determination in step S48 is NO, the program proceeds to step S51.

Figure 10:
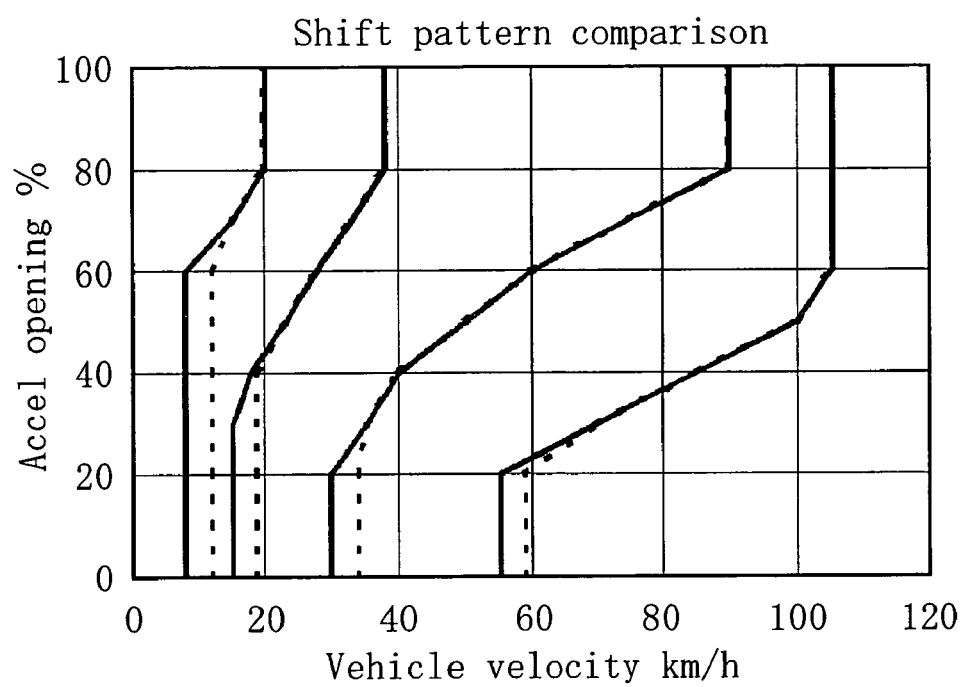
FIG. 10 is a graph showing a comparison between the normal shift pattern and the shift pattern for regeneration deceleration in Embodiment 3 of the present invention.

At this point, a difference between the above two shift patterns will be described with reference to FIG. 10. The solid line in FIG. 10 indicates the normal shift pattern, while the broken line in FIG. 10 indicates the shift pattern for regeneration deceleration. The shift pattern for regeneration deceleration is set to a higher vehicle speed side than the normal shift pattern.

In the subsequent step S52, the fuel injection valve 20 is activated such that main fuel injection is carried out according to the main injection amount and main injection timing set in step S41, or such that when the post-injection amount and post-injection timing have been set in step S44, post-injection is additionally carried out.

In step S53, the shift solenoid 25 is activated such that the gear ratio is controlled according to the shift pattern set in either step S50 or step S51.

According to Embodiment 3, when the engine enters a deceleration condition under the condition that exhaust particulates are removed by burning, the shift lines for changing the gear ratio of the automatic transmission are compensated for to a higher vehicle speed side. Thus, the engine speed can be increased to increase the amount of air taken into the engine, or the drop of the engine speed can be restricted. Therefore, the drop of the flow rate of exhaust gases flowing into the particulate filter 12 can be restricted.

Embodiment 4

Next, description will be made about Embodiment 4 of the present invention.

In the case shown in Embodiment 3, the shift lines for changing the gear ratio of the automatic transmission is compensated for to a higher vehicle speed side when the engine enters a deceleration condition under the condition that exhaust particulates are removed by burning. Embodiment 4 is the case of forcibly changing the gear ratio, which is set according to the shift lines, to a one-stage lower speed side instead of compensating for the shift lines.

Figure 11:
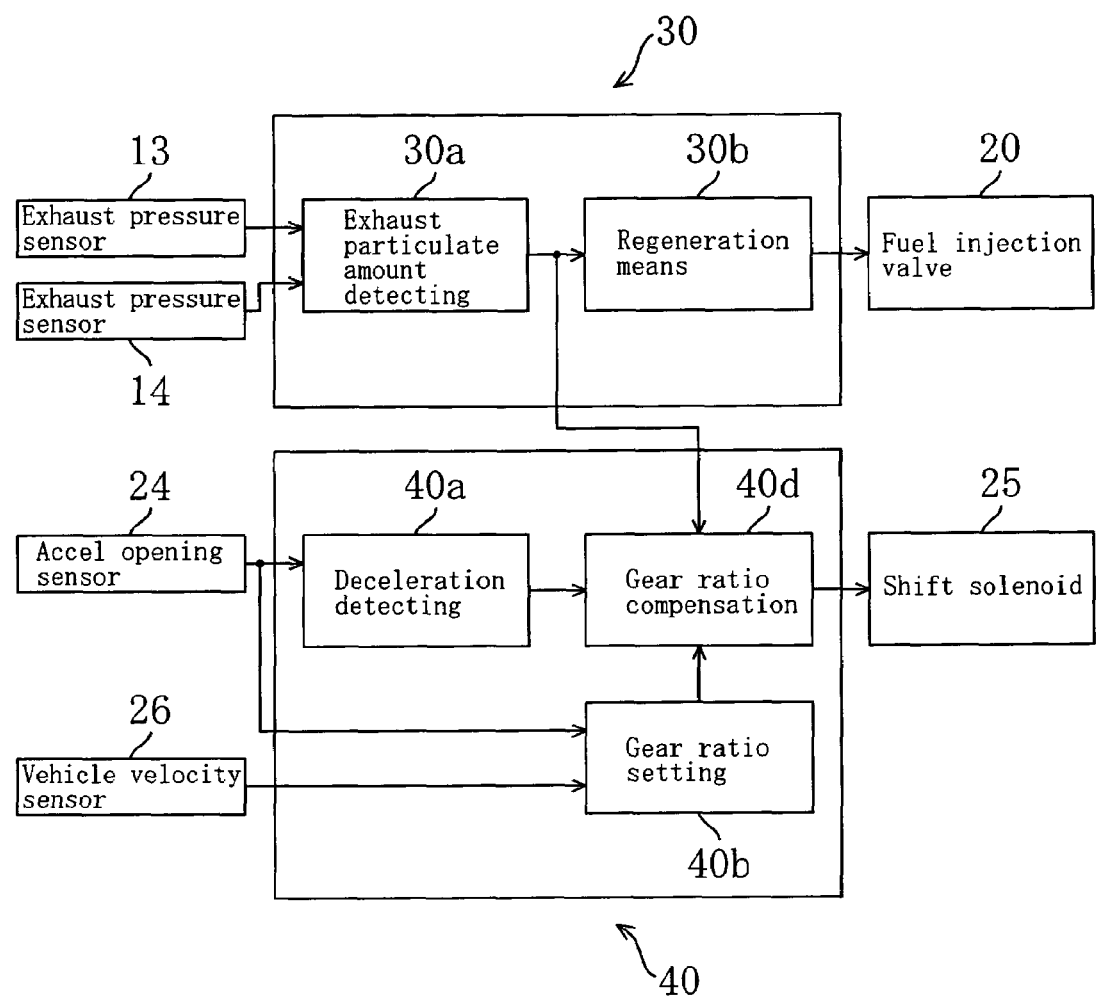
FIG. 11 a control block diagram in Embodiment 4 of the present invention.

FIG. 11 is a control block diagram of Embodiment 4. This embodiment is the same as Embodiment 3, except that a gear ratio compensation means 40*b* is provided instead of the shift line compensation means 40*c* in Embodiment 3.

The gear ratio compensation means 40*d* is configured to forcibly compensate for the gear ratio set by the gear ratio setting means 40*b* to a one-stage lower speed side.

Next, with reference to the flow chart of FIG. 12, the controls of the fuel injection valve 20 and the sift solenoid 25 will be described.

Figure 12:
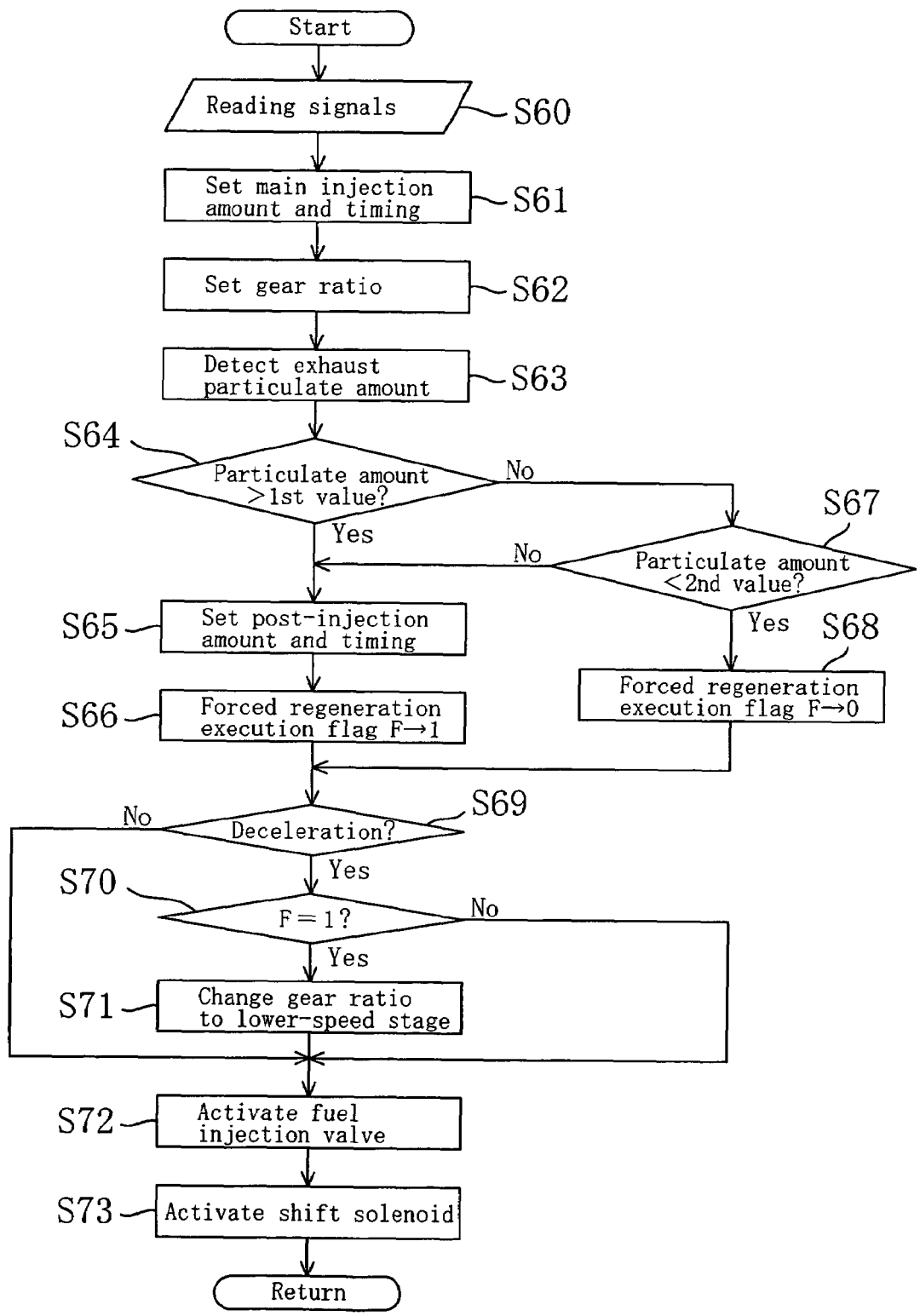
FIG. 12 is a control flow chart in Embodiment 4 of the present invention.

In step S60 of FIG. 12, detection signals from various sensors such as the exhaust pressure sensors 13 and 14, the accel opening sensor 24 and the vehicle speed sensor 25 are read.

In the subsequent step S61, the main injection amount of fuel injected in the vicinity of the top dead center on the compression stroke is set by referring to a main injection amount map based on the engine speed and the accel opening, and the main injection timing is set by referring to a main injection timing map based on the engine speed and the fuel injection amount.

In step S62, the gear ratio is set according to the accel opening and vehicle speed at the time with reference to a normal shift pattern (for example, FIG. 9A as described above).

In step S63, the amount of exhaust particulate trapped by the particulate filter 12 is detected based on the differential pressure between the exhaust pressure sensors 13 and 14.

In step S64, it is determined whether or not the amount of exhaust particulate detected in step S63 is above a first predetermined value equivalent to the saturation amount for the particulate filter 12.

If the determination in step S64 is YES, i.e., if the particulate filter 12 has trapped exhaust particulates to an extent equivalent to its saturation amount, it is necessary to remove the exhaust particulates by burning and thereby regenerate the particulate filter 12. In this case, the program proceeds to step S65 wherein the post-injection amount and post-injection timing (here, both fixed values) are set, and then proceeds to step S66 wherein a forced regeneration execution flag F is set at 1.

If the determination in step S64 is NO, the program proceeds to step S67 wherein it is determined whether or not the amount of exhaust particulate is below a second predetermined value (the value set to be smaller than the first predetermined value, e.g., a value near to zero).

If the determination in step S67 is NO, this shows that the amount of exhaust particulate trapped is still large. In this case, the program proceeds to step S65 wherein the post-injection amount and post-injection timing are set as described above.

If the determination in step S67 is YES, i.e., if the particulate filter 12 is regenerated sufficiently, the program proceeds to step S68, without setting the post-injection amount and timing and changing the gear ratio to a lower-speed stage side, in which the forced regeneration execution flag F is set at 0.

In the subsequent step S69, it is determined whether or not the engine enters a deceleration condition.

If the determination in step S69 is YES, the program proceeds to step S70 wherein it is determined whether or not the forced regeneration execution flag F is set at 1.

If the determination in step S70 is YES, i.e., when the engine operating condition has changed to a deceleration condition during the removal by burning of exhaust particulates, the program proceeds to step S71 wherein the gear ratio set in step S62 is compensated for to a one-stage lower speed side.

On the other hand, if the determination in step S70 is NO, the program bypasses the procedure in step S71 and jumps to step S72.

If the determination in step S69 is NO, the program also jumps to step S72.

In step S72, the fuel injection valve 20 is activated such that main fuel injection is carried out according to the main injection amount and main injection timing set in step S61, or such that when the post-injection amount and post-injection timing have been set in step S65, post-injection is additionally carried out.

In step S73, the shift solenoid 25 is activated such that the gear ratio is either the value set in step S62 or the value changed in step S71.

According to Embodiment 4, when the engine enters a deceleration condition under the condition that exhaust particulates are removed by burning, the gear ratio of the automatic transmission is compensated for to a one-stage lower speed side. Thus, the engine speed can be increased to increase the amount of air taken into the engine. Therefore, the drop of the flow rate of exhaust gases flowing into the particulate filter 12 can be restricted.

Embodiment 5

Next, description will be made about Embodiment 5 of the present invention.

Embodiment 5 is the case that when the engine enters a deceleration condition under the condition that exhaust particulates are removed by burning, the slip amount between input and output members of a torque converter (not shown) as a fluid coupling equipped with an automatic transmission is changed to increase.

Figure 13:
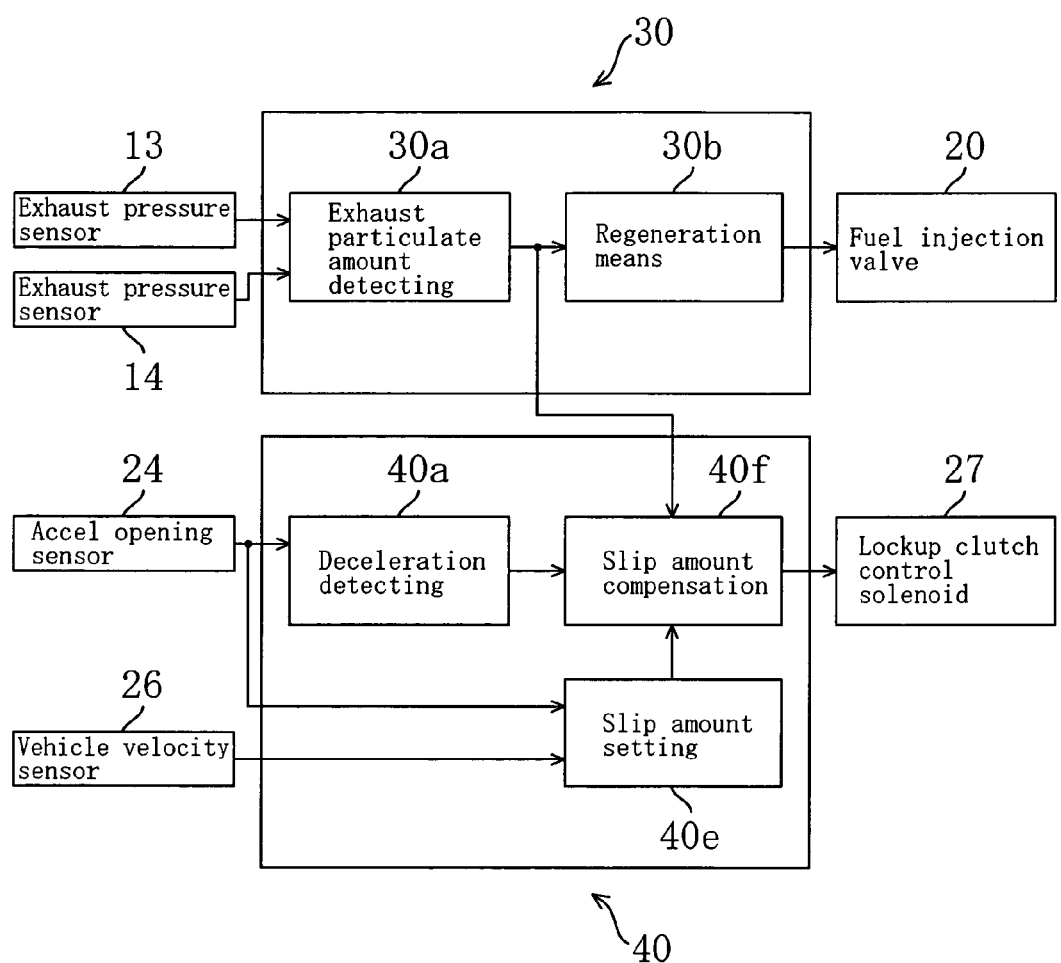
FIG. 13 a control block diagram in Embodiment 5 of the present invention.

FIG. 13 is a control block diagram of Embodiment 5. As shown in the figure, the engine control unit 30 is provided, like Embodiments 1 and 2, with an exhaust particulate amount detecting means 30*a* and regeneration means 30*b* in order to control the fuel injection valve 20 to remove exhaust particulates by burning.

The exhaust particulate after-treatment system of this embodiment further includes an automatic transmission control unit 40. The automatic transmission control unit 40 receives detection signals of the accel opening sensor 24 and the vehicle speed sensor (not shown), and allows a lockup clutch control solenoid 27 to control a lockup clutch (not shown) for adjusting the engagement condition (slip amount) between the input and output members of the torque converter (not shown).

The automatic transmission control unit 40 is provided with a deceleration detecting means 40*a* for detecting deceleration based on the amount of change in accel opening, a slip amount setting means 40*e* for setting the slip amount according to the accel opening and the vehicle speed, and a shift amount compensation means 40*f* for changing the slip amount set by the slip amount setting means 40*e* to increase it when an engine deceleration condition is detected by the deceleration detecting means 40*a* under the conditions that the amount of exhaust particulate detected by the exhaust particulate amount detecting means 30*a* has reached the first predetermined value or more and the exhaust particulates are being removed by burning.

Next, with reference to the flow chart of FIG. 14, the controls of the fuel injection valve 20 and the lockup clutch control solenoid 27 will be described.

Figure 14:
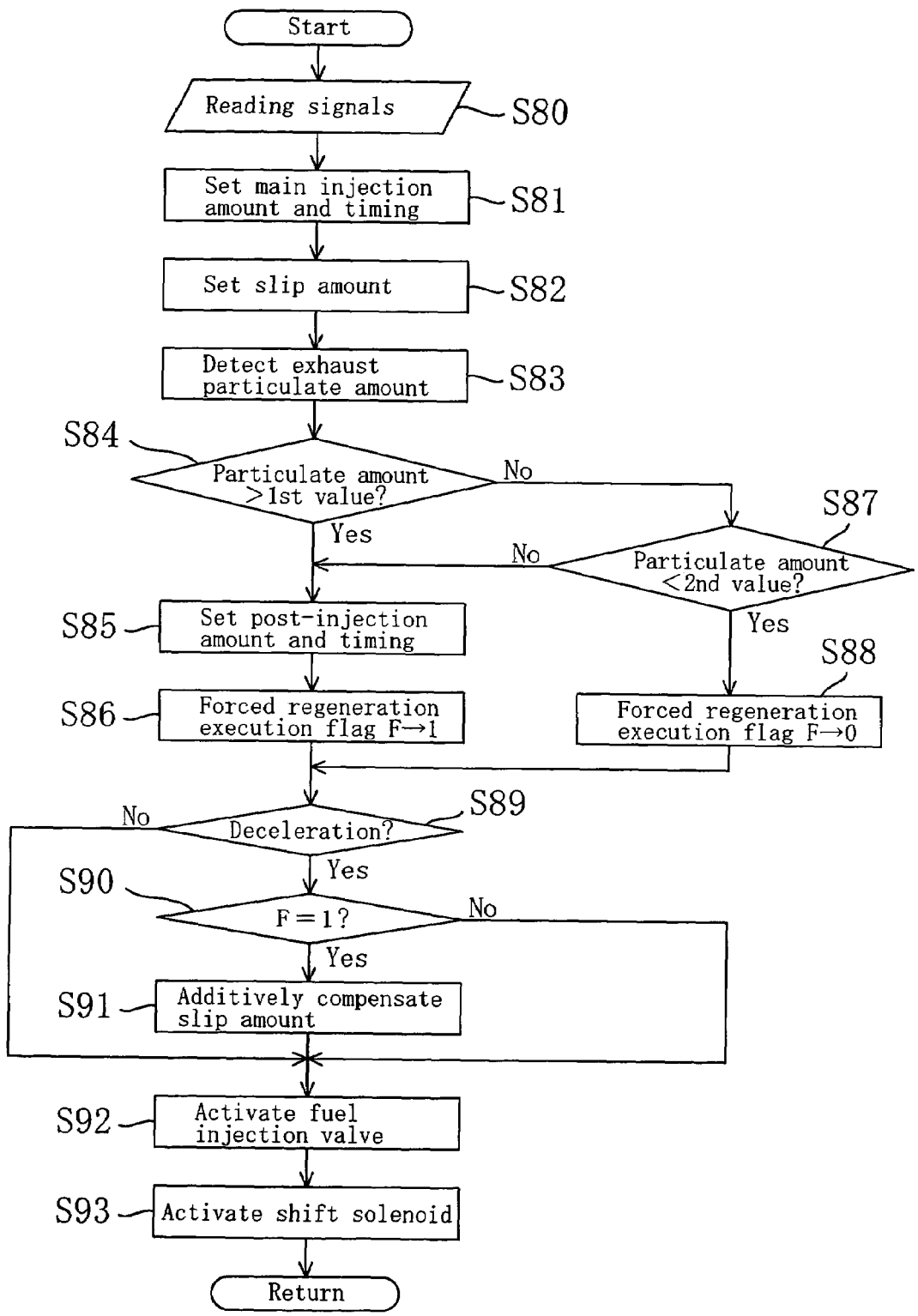
FIG. 14 is a control flow chart in Embodiment 5 of the present invention.

In step S80 of FIG. 14, detection signals from various sensors such as the exhaust pressure sensors 13 and 14, the accel opening sensor 24 and the vehicle speed sensor 25 are read.

In the subsequent step S81, the main injection amount of fuel injected in the vicinity of the top dead center on the compression stroke is set by referring to a main injection amount map based on the engine speed and the accel opening, and the main injection timing is set by referring to a main injection timing map based on the engine speed and the fuel injection amount.

In step S82, the slip amount is set by referring to a slip amount map based on the accel opening and the vehicle speed.

In step S83, the amount of exhaust particulate trapped by the particulate filter 12 is detected based on the differential pressure between the exhaust pressure sensors 13 and 14.

In step S84, it is determined whether or not the amount of exhaust particulate detected in step S83 is above a first predetermined value equivalent to the saturation amount for the particulate filter 12.

If the determination in step S84 is YES, i.e., if the particulate filter 12 has trapped exhaust particulates to an extent equivalent to its saturation amount, it is necessary to remove the exhaust particulates by burning and thereby regenerate the particulate filter 12. In this case, the program proceeds to step S85 wherein the post-injection amount and post-injection timing (here, both fixed values) are set, and then proceeds to step S86 wherein a forced regeneration execution flag F is set at 1.

If the determination in step S84 is NO, the program proceeds to step S87 wherein it is determined whether or not the amount of exhaust particulate is below a second predetermined value (the value set to be smaller than the first predetermined value, e.g., a value near to zero).

If the determination in step S87 is NO, this shows that the amount of exhaust particulate trapped is still large. In this case, the program proceeds to step S85 wherein the post-injection amount and post-injection timing are set as described above.

If the determination in step S87 is YES, i.e., if the particulate filter 12 is regenerated sufficiently, the program proceeds to step S88, without setting the post-injection amount and timing and changing the gear ratio to a lower-speed stage side, in which the forced regeneration execution flag F is set at 0.

In the subsequent step S89, it is determined whether or not the engine enters a deceleration condition.

If the determination in step S89 is YES, the program proceeds to step S90 wherein it is determined whether or not the forced regeneration execution flag F is set at 1.

If the determination in step S90 is YES, i.e., when the engine operating condition has changed to a deceleration condition during the removal by burning of exhaust particulates, the program proceeds to step S91 wherein the slip amount set in step S82 is additively compensated for by some given amount (in this case, a fixed amount).

On the other hand, if the determination in step S90 is NO, the program bypasses the procedure in step S91 and jumps to step S92.

If the determination in step S89 is NO, the program also jumps to step S92.

In step S92, the fuel injection valve 20 is activated such that main fuel injection is carried out according to the main injection amount and main injection timing set in step S81, or such that when the post-injection amount and post-injection timing have been set in step S85, post-injection is additionally carried out.

In step S93, the lockup clutch control solenoid 27 is activated such that the slip amount is either the value set in step S82 or the value changed in step S91.

According to Embodiment 5, when the engine enters a deceleration condition under the condition that exhaust particulates are removed by burning, the slip amount of the torque converter is additively compensated for. Thus, the engine speed can be increased to increase the amount of air taken into the engine. Therefore, the drop of the flow rate of exhaust gases flowing into the particulate filter 12 can be restricted.

Embodiments 1 and 2 disclose the case where the EGR amount set in the EGR map is reduced by a fixed amount when the engine enters a deceleration condition under the condition that exhaust particulates are removed by burning. Alternatively, individual EGR maps may be plotted for the normal condition and the condition where the engine enters a deceleration condition while exhaust particulates are being removed by burning, respectively, and both the maps may be separately used for the two conditions to reduce the EGR amount.

Embodiments 1 and 2 disclose the case where the EGR amount set in the EGR map is reduced by a fixed amount when the engine enters a deceleration condition under the condition that exhaust particulates are removed by burning. At the time, the EGR amount may be reduced to zero.

Embodiments 1 and 2 disclose the case where the intake throttle valve opening set in the intake throttle valve opening map is compensated for to become wider by some given amount when the engine enters a deceleration condition under the condition that exhaust particulates are removed by burning. Alternatively, individual intake throttle valve opening maps may be plotted for the normal condition and the condition where the engine enters a deceleration condition while exhaust particulates are being removed by burning, respectively, and both the maps may be separately used for two conditions to additively compensate for the intake throttle valve opening.

Embodiments 1 and 2 disclose the case where a several kinds of engine controls including subtractive compensation of the EGR amount, additive compensation of the intake throttle valve opening and inhibition of fuel injection cutoff are carried out in combination. Alternatively, at least one of the above engine controls may be carried out in combination with at least one of the automatic transmission controls including compensation of the shift lines for the automatic transmission to a higher vehicle speed side, compensation of the gear ratio to a one-stage lower speed side, and additive compensation of the slip amount.

Embodiments 3 to 5 disclose the cases that when the engine enters a deceleration condition during execution of forced regeneration, the shift lines are compensated for to a higher vehicle speed side, the gear ratio is compensated for to a one-stage lower speed side, and the slip amount is additively compensated for, respectively. Similar controls may also be conducted when the operating condition enters a deceleration condition under a natural regeneration condition lying in the operating zone outside of the preset curve L1 in FIG. 3.

Some of the above embodiments disclose post-injection as an exemplary manner to remove exhaust particulates by burning. Instead of this, the fuel injection timing for main injection may be retarded to cause afterburning. Alternatively, the particulate filter 12 may be provided with a heater so that exhaust particulates can be removed by burning with the heater.

The above embodiments disclose the case where an engine deceleration condition is detected based on the amount of change in accel opening. Instead of this, various kinds of manners to detect a deceleration condition are applicable to this invention. For example, a deceleration condition may be detected based on the amount of change in engine speed. Alternatively, when the engine speed is an idling speed or more and the accel opening is narrowed to the opening corresponding to an idling operation, it may be detected as a deceleration condition.

In the above embodiments, the controls in the present invention are carried out by storing the computer programs for the controls in memories of the engine control unit 30 and the automatic transmission control unit 40. Such controls may be carried out by storing the computer programs in a storage media (such as a CD-ROM) separate from the control units 30 and 40.

Alternatively, the controls may be carried out by obtaining the computer programs through a wireless communication means such as the Internet and storing the obtained programs in a writable ROM.

What is claimed is:

1. An engine exhaust particulate after-treatment system comprising:
    exhaust particulate trapping means provided in an exhaust path of an engine for trapping particles in exhaust gases;
    exhaust particulate amount detecting means for directly or indirectly detecting the amount of exhaust particulate trapped by the exhaust particulate trapping means;
    regeneration means for removing exhaust particulates trapped by the exhaust particulate trapping means by burning when the amount of exhaust particulate detected by the exhaust particulate amount detecting means reaches a predetermined value;
    deceleration detecting means for detecting a deceleration condition of the engine; and
    exhaust flow rate increase means for increasing, as compared to a non-removal process, the flow rate of exhaust gases flowing into the exhaust particular trapping means, when a deceleration condition of the engine is detected by the deceleration detecting means during the removal by burning of exhaust particulates by the regeneration means.

2. The engine exhaust particulate after-treatment system of claim 1, further comprising:
    an exhaust gas recirculation path for communicating part of the exhaust path upstream of the exhaust particulate trapping means with an intake path of the engine;
    an exhaust gas recirculation valve disposed in the exhaust gas recirculation path;
    exhaust gas recirculation amount setting means for setting the amount of recirculation of exhaust gases through the exhaust gas recirculation valve according to the operating condition of the engine; and
    exhaust gas recirculation amount compensation means for compensating the amount of recirculation of exhaust gases set by the exhaust gas recirculation amount setting means,
    wherein the exhaust flow rate drop restriction means is formed by the exhaust gas recirculation amount compensation means, and when a deceleration condition of the engine is detected by the deceleration detecting means during the removal by burning of exhaust particulates, the exhaust gas recirculation amount compensation means subtractively compensates for the amount of recirculation of exhaust gases set by the exhaust gas recirculation amount setting means.

3. The engine exhaust particulate after-treatment system of claim 2, further comprising:
    an intake throttle valve disposed in an intake path of the engine;
    intake throttle valve opening setting means for setting the opening of the intake throttle valve according to the operating condition of the engine; and
    intake throttle valve opening compensation means for compensating for the opening of the intake throttle valve set by the intake throttle valve opening setting means,
    wherein the exhaust flow rate drop restriction means is formed by the exhaust gas recirculation amount compensation means and the intake throttle valve opening compensation means, and when a deceleration condition of the engine is detected by the deceleration detecting means during the removal by burning of exhaust particulates, the intake throttle valve opening compensation means compensates for the opening of the intake throttle valve, which is controlled according to the engine operating condition, to become wider.

4. The engine exhaust particulate after-treatment system of claim 3, further comprising:
    fuel injection means for injecting fuel into a combustion chamber of the engine;
    fuel injection cutoff means for cutting off fuel injection of the fuel injection means when a deceleration condition of the engine is detected by the deceleration detecting means; and
    fuel injection cutoff inhibition means for inhibiting the operation of the fuel injection cutoff means,
    wherein the exhaust flow rate drop restriction means is formed by the exhaust gas recirculation amount compensation means, the intake throttle valve opening compensation means and the fuel injection cutoff inhibition means, and the fuel injection cutoff inhibition means is configured, when a deceleration condition of the engine is detected by the deceleration detecting means during the removal by burning of exhaust particulates, to inhibit the fuel injection cutoff means from cutting off fuel injection.

5. The engine exhaust particulate after-treatment system of claim 2, further comprising:
    fuel injection means for injecting fuel into a combustion chamber of the engine;
    fuel injection cutoff means for cutting off fuel injection of the fuel injection means when a deceleration condition of the engine is detected by the deceleration detecting means; and
    fuel injection cutoff inhibition means for inhibiting the operation of the fuel injection cutoff means,
    wherein the exhaust flow rate drop restriction means is formed by the exhaust gas recirculation amount compensation means and the fuel injection cutoff inhibition means, and the fuel injection cutoff inhibition means is configured, when a deceleration condition of the engine is detected by the deceleration detecting means during the removal by burning of exhaust particulates, to inhibit the fuel injection cutoff means from cutting off fuel injection.

6. The engine exhaust particulate after-treatment system of claim 2, further comprising:
    an automatic transmission;
    gear ratio setting means for setting the gear ratio of the automatic transmission based on predetermined shift lines according to the running conditions of a vehicle; and shift line compensation means for compensating for the shift lines of the gear ratio setting means, wherein the exhaust flow rate drop restriction means is formed by the exhaust gas recirculation amount compensation means and the shift line compensation means, and the shift line compensation means is configured, when a deceleration condition of the engine is detected by the deceleration detecting means during the removal by burning of exhaust particulates, to compensate for the shift lines of the gear ratio setting means to a higher vehicle speed side.

7. The engine exhaust particulate after-treatment system of claim 1, further comprising:

an intake throttle valve disposed in an intake path of the engine;

intake throttle valve opening setting means for setting the opening of the intake throttle valve according to the operating condition of the engine; and intake throttle valve opening compensation means for compensating for the opening of the intake throttle valve set by the intake throttle valve opening setting means, wherein the exhaust flow rate drop restriction means is formed by the intake throttle valve opening compensation means, and when a deceleration condition of the engine is detected by the deceleration detecting means dining the removal by burning of exhaust particulates, the intake throttle valve opening compensation means compensates for the opening of the intake throttle valve, which is controlled according to the engine operating condition, to become wider.

8. The engine exhaust particulate after-treatment system of claim 1, further comprising:

fuel injection means for injecting fuel into a combustion chamber of the engine;

fuel injection cutoff means for cutting off fuel injection of the fuel injection means when a deceleration condition of the engine is detected by the deceleration detecting means; and fuel injection cutoff inhibition means for inhibiting the operation of the fuel injection cutoff means, wherein the exhaust flow rate drop restriction means is formed by the fuel injection cutoff inhibition means, and when a deceleration condition of the engine is detected by the deceleration detecting means during the removal by burning of exhaust particulates, the fuel injection cutoff inhibition means inhibits the fuel injection cutoff means from cutting off fuel injection.

9. The engine exhaust particulate after-treatment system of claim 1, further comprising:

an automatic transmission;

gear ratio setting means for setting the gear ratio of the automatic transmission based on predetermined shift lines according to the running conditions of a vehicle; and shift line compensation means for compensating for the shift lines of the gear ratio setting means, wherein the exhaust flow rate drop restriction means is formed by the shift line compensation means, and when a deceleration condition of the engine is detected by the deceleration detecting means during the removal by burning of exhaust particulates, the shift line compensation means compensates for the shift lines of the gear ratio setting means to a higher vehicle speed side.

10. The engine exhaust particulate after-treatment system of claim 1, further comprising:

an automatic transmission;

gear ratio setting means for setting the gear ratio of the automatic transmission based on predetermined shift lines according to the running conditions of a vehicle; and gear ratio compensation means for compensating for the gear ratio set by the gear ratio setting means, wherein the exhaust flow rate drop restriction means is formed by the gear ratio compensation means, and when a deceleration condition of the engine is detected by the deceleration detecting means during the removal by burning of exhaust particulates, the gear ratio compensation means compensates for the gear ratio set by the gear ratio setting means to a lower-speed stage side.

11. The engine exhaust particulate after-treatment system of claim 1, further comprising:

an automatic transmission;

slip amount setting means for setting the slip amount between input and output members of a fluid coupling equipped with the automatic transmission according to the running conditions of a vehicle; and slip amount compensation means for compensating for the slip amount set by the slip amount setting means, wherein the exhaust flow rate drop restriction means is formed by the slip amount compensation means, and when a deceleration condition of the engine is detected by the deceleration detecting means during the removal by burning of exhaust particulates, the slip amount compensation means additively compensates for the slip amount set by the slip amount setting means.

* * * * *